United States Patent
Tang et al.

(10) Patent No.: US 8,194,172 B2
(45) Date of Patent: Jun. 5, 2012

(54) OPTICAL IMAGING LENS ASSEMBLY

(75) Inventors: Hsiang Chi Tang, Taichung (TW); Chun Shan Chen, Taichung (TW); Tsung Han Tsai, Taichung (TW); Hsin Hsuan Huang, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 75 days.

(21) Appl. No.: 12/958,999

(22) Filed: Dec. 2, 2010

(65) Prior Publication Data
US 2012/0062783 A1  Mar. 15, 2012

(30) Foreign Application Priority Data

Sep. 15, 2010 (TW) ................................ 99131290 A

(51) Int. Cl.
*H04N 5/225* (2006.01)
*G02B 3/02* (2006.01)
(52) U.S. Cl. ........................ 348/340; 359/716
(58) Field of Classification Search .................. 348/335, 348/340; 359/716, 784
See application file for complete search history.

(56) References Cited

U.S. PATENT DOCUMENTS

| 7,436,603 | B2  | 10/2008 | Huang et al. |
| 7,525,741 | B1  | 4/2009 | Noda |
| 7,916,401 | B2* | 3/2011 | Chen et al. .................... 359/716 |
| 8,000,033 | B1* | 8/2011 | Tang et al. .................... 359/716 |
| 8,077,400 | B2* | 12/2011 | Tang ............................ 359/716 |
| 8,081,393 | B2* | 12/2011 | Chen et al. .................... 359/716 |
| 8,154,807 | B2* | 4/2012 | Tsai et al. ..................... 359/716 |

* cited by examiner

*Primary Examiner* — David N Spector
(74) *Attorney, Agent, or Firm* — Morris Manning & Martin LLP; Tim Tingkang Xia, Esq.

(57) ABSTRACT

The present invention provides an optical imaging lens assembly comprising, in order from an object side to an image side: a first lens element with positive refractive power having a convex object-side surface; a second lens element with negative refractive power having a concave object-side surface; and a third lens element with negative refractive power having a concave image-side surface, at least one of the object-side and image-side surfaces thereof being aspheric. With the aforementioned arrangement of lens elements, the total track length of the optical imaging lens assembly can be effectively reduced, the sensitivity of the optical system can be attenuated, a large field of view can be achieved and the image quality can be improved.

20 Claims, 31 Drawing Sheets

| TABLE 1 | | | | | | | |
|---|---|---|---|---|---|---|---|
| (Embodiment 1) | | | | | | | |
| f = 1.71 mm, Fno = 2.07, HFOV = 37.5 deg. | | | | | | | |
| Surface # | | Curvature Radius | Thickness | Material | Index | Abbe # | Focal length |
| 0 | Object | Plano | Infinity | | | | |
| 1 | Lens 1 | 1.25892 (ASP) | 0.402 | Plastic | 1.544 | 55.9 | 1.51 |
| 2 | | -2.09421 (ASP) | -0.058 | | | | |
| 3 | Ape. Stop | Plano | 0.376 | | | | |
| 4 | Lens 2 | -0.41707 (ASP) | 0.285 | Plastic | 1.632 | 23.4 | -129.44 |
| 5 | | -0.53014 (ASP) | 0.035 | | | | |
| 6 | Lens 3 | 1.41432 (ASP) | 0.551 | Plastic | 1.530 | 55.8 | -47.83 |
| 7 | | 1.15727 (ASP) | 0.100 | | | | |
| 8 | IR-filter | Plano | 0.300 | Glass | 1.517 | 64.2 | - |
| 9 | | Plano | 0.456 | | | | |
| 10 | Image | Plano | - | | | | |

Fig.8

| TABLE 2 | | | |
|---|---|---|---|
| Aspheric Coefficients | | | |
| Surface # | 1 | 2 | 4 |
| k = | -9.80939E+00 | 0.00000E+00 | -4.75861E+00 |
| A4 = | 2.88644E-01 | -6.79585E-01 | -4.51677E+00 |
| A6 = | -3.86326E+00 | -1.85884E+00 | 3.18203E+01 |
| A8 = | 1.24769E+01 | 7.46615E+00 | -7.26329E+01 |
| A10= | -4.06492E+01 | -1.25922E+01 | 4.94597E+01 |
| Surface # | 5 | 6 | 7 |
| k = | -7.72036E-01 | -9.00481E+01 | -2.17338E+01 |
| A4 = | 5.59950E-02 | 1.65751E-01 | -3.57325E-01 |
| A6 = | 7.30086E+00 | -2.51711E-01 | 4.51247E-01 |
| A8 = | -2.85951E+00 | 1.01449E-01 | -3.86233E-01 |
| A10= | -1.04799E+01 | | 1.20763E-01 |
| A12= | | | -1.44852E-02 |

Fig.9

| TABLE 3 | | | | | | | |
|---|---|---|---|---|---|---|---|
| (Embodiment 2) | | | | | | | |
| f = 1.90 mm, Fno = 2.40, HFOV = 32.5 deg. | | | | | | | |
| Surface # | | Curvature Radius | Thickness | Material | Index | Abbe # | Focal length |
| 0 | Object | Plano | Infinity | | | | |
| 1 | Lens 1 | 0.77505 (ASP) | 0.430 | Plastic | 1.544 | 55.9 | 1.46 |
| 2 | | 24.20920 (ASP) | 0.017 | | | | |
| 3 | Ape. Stop | Plano | 0.243 | | | | |
| 4 | Lens 2 | -0.53744 (ASP) | 0.300 | Plastic | 1.632 | 23.4 | -6.75 |
| 5 | | -0.74777 (ASP) | 0.167 | | | | |
| 6 | Lens 3 | 1.52476 (ASP) | 0.429 | Plastic | 1.544 | 55.9 | -37.65 |
| 7 | | 1.27843 (ASP) | 0.100 | | | | |
| 8 | IR-filter | Plano | 0.200 | Glass | 1.517 | 64.2 | - |
| 9 | | Plano | 0.462 | | | | |
| 10 | Image | Plano | - | | | | |

Fig.10

| TABLE 4 | | | |
|---|---|---|---|
| Aspheric Coefficients | | | |
| Surface # | 1 | 2 | 4 |
| k    = | -1.49484E+00 | -5.02658E-12 | -2.51268E+00 |
| A4 = | 3.58977E-01 | -2.48147E-01 | -1.24045E+00 |
| A6 = | -5.47228E-01 | -8.06477E+00 | -1.26679E+01 |
| A8 = | 1.99813E+00 | 9.75334E+01 | 2.83081E+02 |
| A10= | -9.40792E+00 | -8.19428E+02 | -1.86890E+03 |
| A12= | -3.98155E+01 | 2.51387E+03 | 3.74071E+03 |
| Surface # | 5 | 6 | 7 |
| k    = | -5.56597E-01 | -3.12489E+01 | -6.66761E+00 |
| A4 = | -1.89391E-01 | -9.36577E-01 | -9.68992E-01 |
| A6 = | 2.55436E+00 | 2.24350E+00 | 1.60223E+00 |
| A8 = | 2.29356E+01 | -2.48674E+00 | -2.28681E+00 |
| A10= | -5.58642E+01 | 6.11388E-01 | 1.86216E+00 |
| A12= | 1.52531E+00 | 4.30908E-01 | -7.24430E-01 |

Fig.11

| TABLE 5 | | | | | | | |
|---|---|---|---|---|---|---|---|
| (Embodiment 3) | | | | | | | |
| f = 1.65 mm, Fno = 2.40, HFOV = 35.9 deg. | | | | | | | |
| Surface # | | Curvature Radius | Thickness | Material | Index | Abbe # | Focal length |
| 0 | Object | Plano | Infinity | | | | |
| 1 | Lens 1 | 0.82740 (ASP) | 0.428 | Plastic | 1.544 | 55.9 | 1.52 |
| 2 | | -212.97450 (ASP) | 0.050 | | | | |
| 3 | Ape. Stop | Plano | 0.147 | | | | |
| 4 | Lens 2 | -0.84507 (ASP) | 0.280 | Plastic | 1.607 | 26.6 | -21.75 |
| 5 | | -1.01587 (ASP) | 0.144 | | | | |
| 6 | Lens 3 | 1.09190 (ASP) | 0.452 | Plastic | 1.544 | 55.9 | -27.18 |
| 7 | | 0.86851 (ASP) | 0.180 | | | | |
| 8 | IR-filter | Plano | 0.200 | Glass | 1.517 | 64.2 | - |
| 9 | | Plano | 0.264 | | | | |
| 10 | Image | Plano | - | | | | |

Fig.12

| TABLE 6 | | | |
|---|---|---|---|
| Aspheric Coefficients | | | |
| Surface # | 1 | 2 | 4 |
| k = | -2.08673E+00 | -5.97571E+23 | -1.55395E+00 |
| A4 = | 2.90279E-01 | -1.85464E-01 | -1.54537E+00 |
| A6 = | -3.37729E-01 | -5.87375E+00 | 2.93140E+01 |
| A8 = | -4.42575E-01 | 8.59483E+01 | -1.54921E+02 |
| A10= | 8.19748E+00 | -7.99301E+02 | -3.58664E+02 |
| A12= | -5.38614E+01 | 2.47557E+03 | 3.74071E+03 |
| Surface # | 5 | 6 | 7 |
| k = | 3.63398E-01 | -4.00054E+01 | -8.72525E+00 |
| A4 = | -1.27829E+00 | -9.29699E-01 | -5.82684E-01 |
| A6 = | 1.18321E+01 | 2.43145E+00 | 1.25379E+00 |
| A8 = | 4.85667E+00 | -2.29397E+00 | -2.13867E+00 |
| A10= | -6.97871E+01 | 8.47010E-01 | 1.89190E+00 |
| A12= | 2.91772E-01 | -2.43118E-01 | -6.45957E-01 |

Fig.13

| TABLE 7 | | | | | | | |
|---|---|---|---|---|---|---|---|
| (Embodiment 4) | | | | | | | |
| f = 1.65 mm, Fno = 2.40, HFOV = 36.0 deg. | | | | | | | |
| Surface # | | Curvature Radius | Thickness | Material | Index | Abbe # | Focal length |
| 0 | Object | Plano | Infinity | | | | |
| 1 | Lens 1 | 0.77678 (ASP) | 0.432 | Plastic | 1.544 | 55.9 | 1.52 |
| 2 | | 10.60880 (ASP) | 0.050 | | | | |
| 3 | Ape. Stop | Plano | 0.142 | | | | |
| 4 | Lens 2 | -0.81436 (ASP) | 0.280 | Plastic | 1.607 | 26.6 | -17.29 |
| 5 | | -0.99751 (ASP) | 0.167 | | | | |
| 6 | Lens 3 | 1.00783 (ASP) | 0.428 | Plastic | 1.544 | 55.9 | -44.14 |
| 7 | | 0.82249 (ASP) | 0.200 | | | | |
| 8 | IR-filter | Plano | 0.200 | Glass | 1.517 | 64.2 | - |
| 9 | | Plano | 0.232 | | | | |
| 10 | Image | Plano | - | | | | |

Fig.14

| TABLE 8 | | | |
|---|---|---|---|
| Aspheric Coefficients | | | |
| Surface # | 1 | 2 | 4 |
| k = | -1.93554E+00 | 8.69922E+02 | -4.87214E-01 |
| A4 = | 3.46951E-01 | -3.82890E-01 | -1.86507E+00 |
| A6 = | 1.55816E-01 | -6.78875E+00 | 2.71182E+01 |
| A8 = | -1.84911E+00 | 8.58035E+01 | -1.11330E+02 |
| A10= | 6.09622E+00 | -8.12788E+02 | -7.67194E+02 |
| A12= | -4.49090E+01 | 2.53808E+03 | 3.74071E+03 |
| Surface # | 5 | 6 | 7 |
| k = | 6.63320E-01 | -3.03676E+01 | -8.25613E+00 |
| A4 = | -1.41479E+00 | -9.88375E-01 | -6.29189E-01 |
| A6 = | 1.09692E+01 | 2.43167E+00 | 1.30805E+00 |
| A8 = | 5.20862E+00 | -2.26401E+00 | -2.16709E+00 |
| A10= | -5.90569E+01 | 8.88266E-01 | 1.88689E+00 |
| A12= | 2.95288E-01 | -2.25315E-01 | -6.30998E-01 |

Fig.15

| TABLE 9 | | | | | | |
|---|---|---|---|---|---|---|
| (Embodiment 5) | | | | | | |
| f = 1.65 mm, Fno = 2.40, HFOV = 36.0 deg. | | | | | | |
| Surface # | | Curvature Radius | Thickness | Material | Index | Abbe # | Focal length |
| 0 | Object | Plano | Infinity | | | | |
| 1 | Lens 1 | 0.77451 (ASP) | 0.434 | Plastic | 1.544 | 55.9 | 1.52 |
| 2 | | 10.22850 (ASP) | 0.050 | | | | |
| 3 | Ape. Stop | Plano | 0.140 | | | | |
| 4 | Lens 2 | -0.84718 (ASP) | 0.280 | Plastic | 1.607 | 26.6 | -9.85 |
| 5 | | -1.11025 (ASP) | 0.160 | | | | |
| 6 | Lens 3 | 0.98500 (ASP) | 0.459 | Plastic | 1.544 | 55.9 | 40.19 |
| 7 | | 0.86208 (ASP) | 0.200 | | | | |
| 8 | IR-filter | Plano | 0.200 | Glass | 1.517 | 64.2 | - |
| 9 | | Plano | 0.217 | | | | |
| 10 | Image | Plano | - | | | | |

Fig.16

| TABLE 10 | | | |
|---|---|---|---|
| Aspheric Coefficients | | | |
| Surface # | 1 | 2 | 4 |
| k  = | -1.99038E+00 | 7.84941E+02 | -3.95614E-01 |
| A4 = | 3.64742E-01 | -2.50188E-01 | -1.83181E+00 |
| A6 = | 3.58560E-01 | -7.68008E+00 | 2.65932E+01 |
| A8 = | -2.36593E+00 | 8.19804E+01 | -1.48670E+02 |
| A10= | 6.52600E+00 | -7.91956E+02 | -3.66148E+02 |
| A12= | -4.91196E+01 | 2.53808E+03 | 3.74071E+03 |
| Surface # | 5 | 6 | 7 |
| k  = | 1.38417E+00 | -2.58916E+01 | -7.17515E+00 |
| A4 = | -1.55093E+00 | -1.02453E+00 | -6.66690E-01 |
| A6 = | 1.07250E+01 | 2.43185E+00 | 1.39486E+00 |
| A8 = | 4.72146E+00 | -2.21155E+00 | -2.25037E+00 |
| A10= | -5.03378E+01 | 9.04477E-01 | 1.89505E+00 |
| A12= | 2.95388E-01 | -3.01571E-01 | -6.19042E-01 |

Fig.17

| TABLE 11 | | | | | | | |
|---|---|---|---|---|---|---|---|
| (Embodiment 6) | | | | | | | |
| f = 1.48 mm, Fno = 2.46, HFOV = 38.4 deg. | | | | | | | |
| Surface # | | Curvature Radius | Thickness | Material | Index | Abbe # | Focal length |
| 0 | Object | Plano | Infinity | | | | |
| 1 | Ape. Stop | Plano | -0.050 | | | | |
| 2 | Lens 1 | 0.71184 (ASP) | 0.330 | Plastic | 1.544 | 55.9 | 1.32 |
| 3 | | 100.00000 (ASP) | 0.195 | | | | |
| 4 | Lens 2 | -0.58857 (ASP) | 0.265 | Plastic | 1.634 | 23.8 | -3.81 |
| 5 | | -0.91379 (ASP) | 0.148 | | | | |
| 6 | Lens 3 | 0.66585 (ASP) | 0.323 | Plastic | 1.544 | 55.9 | 6.36 |
| 7 | | 0.68348 (ASP) | 0.300 | | | | |
| 8 | IR-filter | Plano | 0.210 | Glass | 1.517 | 64.2 | - |
| 9 | | Plano | 0.152 | | | | |
| 10 | Image | Plano | - | | | | |

Fig.18

| TABLE 12 | | | | | | |
|---|---|---|---|---|---|---|
| Aspheric Coefficients | | | | | | |
| Surface # | 2 | 3 | 4 | 5 | 6 | 7 |
| k = | -8.72275E-01 | -9.00000E+01 | -7.89422E-01 | 2.04784E+00 | -3.38563E+00 | -2.04219E+00 |
| A4 = | 1.44765E-01 | -1.20023E+00 | -8.66048E-01 | -1.54326E+00 | -2.34353E+00 | -1.48049E+00 |
| A6 = | -4.39729E+00 | -3.83146E+00 | -2.34287E+01 | 9.56862E+00 | 5.26365E+00 | 2.38767E+00 |
| A8 = | 5.81648E+01 | -2.65670E+01 | 2.07506E+02 | -7.42504E+00 | -7.60775E+00 | -3.06066E+00 |
| A10= | -4.00956E+02 | 4.89489E+01 | -1.36129E+02 | 1.44500E+02 | 6.87504E+00 | 2.07352E+00 |
| A12= | -2.22436E+02 | -8.43437E+02 | -2.99852E+03 | -5.51001E+01 | -2.64089E+00 | 1.12963E-01 |
| A14= | | | | -5.80964E+02 | | -1.56765E+00 |
| A16= | | | | | | 8.70216E-01 |

Fig.19

| TABLE 13 | | | | | | | |
|---|---|---|---|---|---|---|---|
| (Embodiment 7) | | | | | | | |
| f = 1.52 mm, Fno = 2.40, HFOV= 37.2 deg. | | | | | | | |
| Surface # | | Curvature Radius | Thickness | Material | Index | Abbe # | Focal length |
| 0 | Object | Plano | Infinity | | | | |
| 1 | Ape. Stop | Plano | -0.070 | | | | |
| 2 | Lens 1 | 0.66810 (ASP) | 0.336 | Plastic | 1.544 | 55.9 | 1.28 |
| 3 | | 12.77140 (ASP) | 0.188 | | | | |
| 4 | Lens 2 | -0.61250 (ASP) | 0.265 | Plastic | 1.650 | 21.4 | -7.40 |
| 5 | | -0.82145 (ASP) | 0.122 | | | | |
| 6 | Lens 3 | 0.90111 (ASP) | 0.369 | Plastic | 1.544 | 55.9 | -14.66 |
| 7 | | 0.69283 (ASP) | 0.200 | | | | |
| 8 | IR-filter | Plano | 0.200 | Glass | 1.517 | 64.2 | - |
| 9 | | Plano | 0.224 | | | | |
| 10 | Image | Plano | - | | | | |

Fig.20

| TABLE 14 | | | |
|---|---|---|---|
| Aspheric Coefficients | | | |
| Surface # | 2 | 3 | 4 |
| k    = | -9.01578E-01 | -1.00000E+00 | -1.55185E+00 |
| A4 = | 1.93387E-01 | -8.82312E-01 | -4.27089E-01 |
| A6 = | -3.48833E+00 | -3.89495E+00 | -3.18702E+01 |
| A8 = | 5.86951E+01 | -1.59179E+01 | 3.14392E+02 |
| A10= | -3.60931E+02 | 1.16462E+01 | -6.52246E+02 |
| A12= | -2.22436E+02 | -1.04067E+03 | -2.99852E+03 |
| Surface # | 5 | 6 | 7 |
| k    = | 1.53584E+00 | -1.54499E+01 | -6.65121E+00 |
| A4 = | -1.23749E+00 | -2.37177E+00 | -1.09461E+00 |
| A6 = | 9.93853E+00 | 5.56056E+00 | 1.94123E+00 |
| A8 = | -1.45999E+00 | -7.32514E+00 | -3.05310E+00 |
| A10= | 1.46030E+02 | 7.00137E+00 | 2.20774E+00 |
| A12= | -5.74564E+01 | -3.48372E+00 | 1.59270E-01 |
| A14= | -7.39222E+02 |  | -1.42314E+00 |
| A16= |  |  | 5.96034E-01 |

Fig.21

TABLE 15

| | Embodiment 1 | Embodiment 2 | Embodiment 3 | Embodiment 4 | Embodiment 5 | Embodiment 6 | Embodiment 7 |
|---|---|---|---|---|---|---|---|
| f | 1.71 | 1.90 | 1.65 | 1.65 | 1.65 | 1.48 | 1.52 |
| Fno | 2.07 | 2.40 | 2.40 | 2.40 | 2.40 | 2.46 | 2.40 |
| HFOV | 37.5 | 32.5 | 35.9 | 36.0 | 36.0 | 38.4 | 37.2 |
| V1-V2 | 32.5 | 32.5 | 29.3 | 29.3 | 29.3 | 32.1 | 34.5 |
| CT2/CT1 | 0.71 | 0.70 | 0.65 | 0.65 | 0.65 | 0.80 | 0.79 |
| R1/R2 | -0.60 | 0.03 | 0.00 | 0.07 | 0.08 | 0.01 | 0.05 |
| f1/f | 0.88 | 0.77 | 0.92 | 0.92 | 0.92 | 0.89 | 0.84 |
| f/f2 | -0.01 | -0.28 | -0.08 | -0.10 | -0.17 | -0.39 | -0.21 |
| Yc1/ImgH | 0.65 | - | - | 0.70 | 0.71 | 0.66 | 0.67 |
| Yc2/ImgH | 0.69 | - | - | - | - | 0.69 | 0.70 |
| SL/TTL | 0.85 | 0.80 | 0.77 | 0.77 | 0.77 | 0.97 | 0.96 |
| TTL/ImgH | 1.83 | 1.90 | 1.73 | 1.72 | 1.73 | 1.54 | 1.60 |

Fig. 22

OPTICAL IMAGING LENS ASSEMBLY

CROSS-REFERENCE TO RELATED PATENT APPLICATION

This non-provisional application claims priority under 35 U.S.C. §119(a) on Taiwanese Patent Application No(s). 099131290 filed in Taiwan, R.O.C., on Sep. 15, 2010, the entire contents of which are hereby incorporated by reference.

BACKGROUND OF THE INVENTION

1. Field of the Invention

The present invention relates to an optical imaging lens assembly, and more particularly, to a compact optical imaging lens assembly with a large field of view.

2. Description of the Prior Art

The demand for compact imaging lenses has grown in recent years as the popularity of portable electronic products with the photographing function has increased, and the sensor of a general imaging lens is none other than CCD (Charge Coupled Device) or CMOS (Complementary Metal Oxide Semiconductor Sensor). Furthermore, as advanced semiconductor manufacturing technology has reduced the pixel size of sensors, and the resolution of compact imaging lenses has gradually increased, there is an increasing demand for compact imaging lenses featuring better image quality.

A conventional compact imaging lens assembly, such as the one disclosed in U.S. Pat. No. 7,525,741, generally comprises two lens elements so as to reduce the production cost. As the two-element lens assembly has limited capability to correct the aberration, its performance became unsatisfactory for a high-end photographing module. However, employing excess number of lens elements will make it difficult to maintain a compact total track length of the lens assembly. To obtain better image quality and still maintain a compact form, a photographing optical lens assembly comprising three lens elements is a feasible solution. The optical lens system for taking image disclosed in U.S. Pat. No. 7,436,603 is a triplet type comprising, in order from the object side to the image side: a first lens element with positive refractive power; a second lens element with negative refractive power; and a third lens element with positive refractive power. Though such arrangement facilitates the correction of the aberration in most optical systems, it requires a longer total track length, and thus the size of the optical lens system for taking image must be increased to accommodate the lengthened total track length. Consequently, the optical lens system for taking image can no longer stay compact. Therefore, a need exists in the art for an optical imaging lens assembly that features better image quality, achieves a large field of view and maintains a moderate total track length.

SUMMARY OF THE INVENTION

The present invention provides an optical imaging lens assembly comprising, in order from an object side to an image side: a first lens element with positive refractive power having a convex object-side surface; a second lens element with negative refractive power having a concave object-side surface; and a third lens element with negative refractive power having a concave image-side surface, at least one of the object-side and image-side surfaces thereof being aspheric; wherein the optical imaging lens assembly further comprises an aperture stop disposed between the first lens element and the second lens element and an electronic sensor for the image formation of an object; and wherein a focal length of the optical imaging lens assembly is f, a focal length of the second lens element is f2, a thickness of the first lens element on an optical axis is CT1, a thickness of the second lens element on the optical axis is CT2, a distance on the optical axis between the aperture stop and the electronic sensor is SL, a distance on the optical axis between the object-side surface of the first lens element and the electronic sensor is TTL, and they satisfy the relations: $-0.22<f/f2<0.0$, $0.30<CT2/CT1<0.95$, $0.65<SL/TTL<0.90$.

The present invention provides another optical imaging lens assembly comprising, in order from an object side to an image side: a first lens element with positive refractive power having a convex object-side surface; a second lens element with negative refractive power having a concave object-side surface and a convex image-side surface; and a third lens element having a concave image-side surface on which at least one inflection point is formed, the object-side and image-side surfaces thereof being aspheric; wherein the optical imaging lens assembly further comprises an aperture stop disposed between an object and the second lens element, and an electronic sensor for the image formation of the object; and wherein a focal length of the optical imaging lens assembly is f, a focal length of the first lens element is f1, a radius of curvature of the object-side surface of the first lens element is R1, a radius of curvature of an image-side surface of the first lens element is R2, a light ray having an incident angle of 36 degrees relative to the optical axis and passing through a center of the aperture stop intersects to form a point on an image-side surface of the lens element closest to the side of image, a perpendicular distance from the point to the optical axis is Yc1, half of a diagonal length of an effective pixel area of the electronic sensor is ImgH, and they satisfy the relations: $0.65<f/f1<1.30$, $-1.00<R1/R2<0.65$, $0.45<Yc1/ImgH<0.95$.

With the aforementioned arrangement of lens elements, the total track length of the optical imaging lens assembly can be effectively reduced, the sensitivity of the optical system can be attenuated, the large field of view can be achieved, and the image quality can be improved.

In the present optical imaging lens assembly, the first lens element with positive refractive power provides the majority of the refractive power of the optical system so as to favorably reduce the total track length of the optical imaging lens assembly; the second lens element having negative refractive power could correct the aberration generated by the first lens element with positive refractive power and the chromatic aberration of the optical system; the third lens element may have positive refractive power so that the principal point of the optical system can be positioned away from the image plane, and thereby the total track length of the optical system can be favorably reduced to keep the lens assembly compact.

In the present optical imaging lens assembly, the first lens element may be a meniscus lens element having a convex object-side surface and a concave image-side surface, or a bi-convex lens element having a convex object-side surface and a convex image-side surface. When the first lens element is a meniscus lens element, the astigmatism of the optical system can be favorably corrected to improve the image quality. When the first lens element is a bi-convex lens element, the refractive power thereof can be distributed effectively, and thereby the total track length of the optical imaging lens assembly can be reduced. The second lens element has a concave object-side surface so that it can provide proper negative refractive power to facilitate the correction of the chromatic aberration of the optical system. The second lens element may have a convex image-side surface so as to favorably correct the astigmatism of the optical system, and thereby the image quality of the optical system can be improved. The third lens element may be a meniscus lens element having a convex object-side surface and a concave image-side surface, or a bi-concave lens element having a concave object-side surface and a concave image-side surface. When the third lens element is a meniscus lens element, the astigmatism and the high order aberration of the optical system can be favorably corrected. When the third lens element is a bi-concave lens element, the principal point of the optical system can be positioned even farther away from the image plane, and thereby the total track length of the optical system can be favorably reduced to keep the lens assembly compact.

In the present optical imaging lens assembly, the aperture stop may be disposed between the object and the first lens element, or between the first lens element and the second lens element. In the present optical imaging lens assembly, the first lens element provides positive refractive power, and the aperture stop is disposed near the object side of the optical imaging lens assembly, and thereby the total track length of the optical imaging lens assembly can be effectively reduced. The aforementioned arrangement also enables the exit pupil of the optical imaging lens assembly to be positioned far away from the image plane, thus light will be projected onto the electronic sensor at a nearly perpendicular angle, and this is the telecentric feature of the image side. The telecentric feature is very important to the photosensitive power of the solid-state sensor as it can improve the photosensitivity of the sensor to reduce the occurrence of shading. Moreover, the third lens element may be provided with at least one inflection point so as to reduce the angle at which the light is projected onto the sensor from the off-axis field effectively. Accordingly, the off-axis aberration can be further corrected. In addition, when the aperture stop is disposed near the second lens element, a wide field of view can be favorably achieved. Such an aperture stop placement facilitates the correction of the distortion and the chromatic aberration of magnification and enables effective attenuation of the sensitivity of the optical system.

Therefore, in the present optical imaging lens assembly, when the aperture stop is disposed between the object and the second lens element, it is for the purpose of the balance between the maintenance of telecentric feature and the wide field of view. In other words, when the aperture stop is disposed between the object and the first lens element, the telecentric feature is emphasized and this enables a shorter total track length. When the aperture stop is disposed between the first lens element and the second lens element, the emphasis is on the wide field of view so that the sensitivity of the optical system can be effectively attenuated.

BRIEF DESCRIPTION OF THE DRAWINGS

FIG. 8 is TABLE 1 which lists the optical data of the first embodiment.

FIG. 9 is TABLE 2 which lists the aspheric surface data of the first embodiment.

FIG. 10 is TABLE 3 which lists the optical data of the second embodiment.

FIG. 11 is TABLE 4 which lists the aspheric surface data of the second embodiment.

FIG. 12 is TABLE 5 which lists the optical data of the third embodiment.

FIG. 13 is TABLE 6 which lists the aspheric surface data of the third embodiment.

FIG. 14 is TABLE 7 which lists the optical data of the fourth embodiment.

FIG. 15 is TABLE 8 which lists the aspheric surface data of the fourth embodiment.

FIG. 16 is TABLE 9 which lists the optical data of the fifth embodiment.

FIG. 17 is TABLE 10 which lists the aspheric surface data of the fifth embodiment.

FIG. 18 is TABLE 11 which lists the optical data of the sixth embodiment.

FIG. 19 is TABLE 12 which lists the aspheric surface data of the sixth embodiment.

FIG. 20 is TABLE 13 which lists the optical data of the seventh embodiment.

FIG. 21 is TABLE 14 which lists the aspheric surface data of the seventh embodiment.

FIG. 22 is TABLE 15 which lists the data of the respective embodiments resulting from the equations.

DETAILED DESCRIPTION OF THE PREFERRED EMBODIMENTS

Figure 1A:
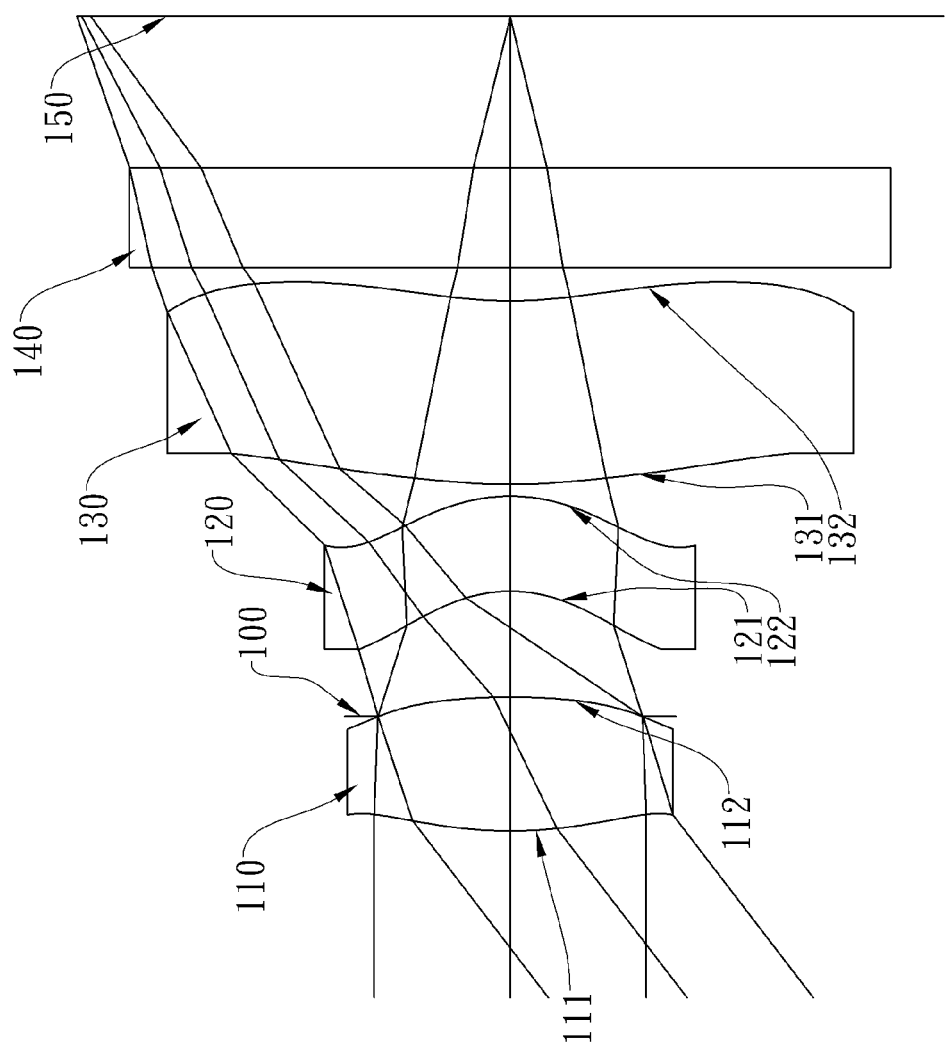
FIG. 1A shows an optical imaging lens assembly in accordance with a first embodiment of the present invention.

The present invention provides an optical imaging lens assembly comprising, in order from an object side to an image side: a first lens element with positive refractive power having a convex object-side surface; a second lens element with negative refractive power having a concave object-side surface; and a third lens element with negative refractive power having a concave image-side surface, at least one of the object-side and image-side surfaces thereof being aspheric; wherein the optical imaging lens assembly further comprises an aperture stop disposed between the first lens element and the second lens element and an electronic sensor for the image formation of an object; and wherein a focal length of the optical imaging lens assembly is f, a focal length of the second lens element is f2, a thickness of the first lens element on an optical axis is CT1, a thickness of the second lens element on the optical axis is CT2, a distance on the optical axis between the aperture stop and the electronic sensor is SL, a distance on the optical axis between the object-side surface of the first lens element and the electronic sensor is TTL, and they satisfy the relations: $-0.22<f/f2<0.0$, $0.30<CT2/CT1<0.95$, $0.65<SL/TTL<0.90$.

When the relation of $-0.22<f/f2<0.0$ is satisfied, the refractive power of the second lens element is more appropriate, and thereby the sensitivity of the optical system can be favorably attenuated and the high order aberration can be further corrected. Preferably, they satisfy the relation: $-0.12<f/f2<0.0$. When the relation of $0.30<CT2/CT1<0.95$ is satisfied, the lens elements can be arranged more appropriately in terms of thickness in the relatively small space. The satisfaction of the above relation enables the optical imaging lens assembly to obtain better image quality while maintaining a compact form. Preferably, CT2 and CT1 satisfy the relation: $0.50<CT2/CT1<0.87$. When the relation of $0.65<SL/TTL<0.90$ is satisfied, a balance between the maintenance of the telecentric feature and the wide field of view can be achieved.

In the aforementioned optical imaging lens assembly, it is preferable that the image-side surface of the third lens element is provided with at least one inflection point so that the angle at which the light is projected onto the sensor from the off-axis field can be effectively reduced to further correct the off-axis aberration.

In the aforementioned optical imaging lens assembly, it is preferable that the object-side and image-side surfaces of the third lens element are aspheric. Aspheric surfaces can be easily made into non-spherical profiles, allowing more design parameter freedom which can be used to reduce the aberration and the number of the lens elements. Accordingly, the total track length of the optical imaging lens assembly can be effectively reduced. Preferably, the third lens element is made of plastic material. The employment of plastic lens elements facilitates a significant reduction in the weight as well as the production cost of the lens assembly.

In the aforementioned optical imaging lens assembly, the focal length of the optical imaging lens assembly is f, the focal length of the first lens element is f1, and they preferably satisfy the relation: $0.65<f1/f<1.30$. When the above relation is satisfied, the refractive power of the first lens element can be distributed in a more balanced degree, and thereby the total track length of the optical system can be effectively controlled to keep the lens assembly compact. The satisfaction of the above relation also prevents the high order spherical aberration from becoming too large, so that the image quality of the optical imaging lens assembly can be improved. And it will be more preferable that they satisfy the relation: $0.72<f1/f<1.10$.

In the aforementioned optical imaging lens assembly, the Abbe number of the first lens element is V1, the Abbe number of the second lens element is V2, and they preferably satisfy the relation: $28.5<V1-V2<42.0$. When the above relation is satisfied, the chromatic aberration of the optical imaging lens assembly can be favorably corrected.

In the aforementioned optical imaging lens assembly, a light ray having an incident angle of 36 degrees relative to the optical axis and passing through a center of the aperture stop intersects to form a point on an image-side surface of the lens element closest to the side of image, the perpendicular distance from the point to the optical axis is Yc1, half of the diagonal length of the effective pixel area of the electronic sensor is ImgH, and they preferably satisfy the relation: $0.45<Yc1/ImgH<0.95$. When the above relation is satisfied, a sufficient field of view can be achieved for the optical imaging lens assembly, and the angle at which the light is projected onto the sensor from the off-axis field can be favorably reduced to further correct the off-axis aberration.

In the aforementioned optical imaging lens assembly, a light ray having an incident angle of 37 degrees relative to the optical axis and passing through a center of the aperture stop intersects to form a point on an image-side surface of the lens element closest to the side of image, the perpendicular distance from the point to the optical axis is Yc2, half of the diagonal length of the effective pixel area of the electronic sensor is ImgH, and they preferably satisfy the relation: $0.55<Yc2/ImgH<0.95$. When the above relation is satisfied, a larger field of view can be achieved for the optical imaging lens assembly, and the angle at which the light is projected onto the sensor from the off-axis field can be favorably reduced to further correct the off-axis aberration.

In the aforementioned optical imaging lens assembly, the distance on the optical axis between the object-side surface of the first lens element and the electronic sensor is TTL, half of the diagonal length of the effective pixel area of the electronic sensor is ImgH, and they preferably satisfy the relation: $TTL/ImgH<1.95$. The satisfaction of the above relation enables the optical imaging lens assembly to maintain a compact form so that it can be installed into compact portable electronic products.

The present invention provides another optical imaging lens assembly comprising, in order from an object side to an image side: a first lens element with positive refractive power having a convex object-side surface; a second lens element with negative refractive power having a concave object-side surface and a convex image-side surface; and a third lens element having a concave image-side surface on which at least one inflection point is formed, the object-side and image-side surfaces thereof being aspheric; wherein the optical imaging lens assembly further comprises an aperture stop disposed between an object and the second lens element and an electronic sensor for the image formation of the object; and wherein a focal length of the optical imaging lens assembly is f, a focal length of the first lens element is f1, a radius of curvature of the object-side surface of the first lens element is R1, a radius of curvature of an image-side surface of the first lens element is R2, a light ray having an incident angle of 36 degrees relative to the optical axis and passing through a center of the aperture stop intersects to form a point on an image-side surface of the lens element closest to the side of image, a perpendicular distance from the point to the optical axis is Yc1, half of a diagonal length of an effective pixel area of the electronic sensor is ImgH, and they satisfy the relations: $0.65<f1/f<1.30$, $-1.00<R1/R2<0.65$, $0.45<Yc1/ImgH<0.95$.

When the relation of $0.65<f1/f<1.30$ is satisfied, the refractive power of the first lens element can be distributed in a more balanced degree, and thereby the total track length of the optical system can be effectively controlled to keep the lens assembly compact. The satisfaction of the above relation also prevents the high order spherical aberration from becoming too large, so that the image quality of the optical imaging lens assembly can be improved. Preferably, they satisfy the relation: $0.72<f1/f<1.10$. When the relation of $-1.00<R1/R2<0.65$ is satisfied, the spherical aberration of the optical system can be favorably corrected. When the relation of $0.45<Yc1/ImgH<0.95$ is satisfied, a sufficient field of view can be achieved for the optical imaging lens assembly, and the angle at which the light is projected onto the sensor from the off-axis field can be favorably reduced to further correct the off-axis aberration.

In the aforementioned optical imaging lens assembly, the distance on the optical axis between the aperture stop and the electronic sensor is SL, the distance on the optical axis between the object-side surface of the first lens element and the electronic sensor is TTL, and they preferably satisfy the relation: 0.60<SL/TTL<1.10. When the above relation is satisfied, a balance between the maintenance of the telecentric feature and the wide field of view can be favorably achieved.

In the aforementioned optical imaging lens assembly, the Abbe number of the first lens element is V1, the Abbe number of the second lens element is V2, and they preferably satisfy the relation: 28.5<V1−V2<42.0. When the above relation is satisfied, the chromatic aberration of the optical imaging lens assembly can be favorably corrected.

In the aforementioned optical imaging lens assembly, the thickness of the first lens element on the optical axis is CT1, the thickness of the second lens element on the optical axis is CT2, and they preferably satisfy the relation: 0.50<CT2/CT1<0.87. When the above relation is satisfied, the lens elements can be arranged more appropriately in terms of thickness in the relatively small space. The satisfaction of the above relation enables the optical imaging lens assembly to obtain better image quality while maintaining a compact form.

In the aforementioned optical imaging lens assembly, a light ray having an incident angle of 37 degrees relative to the optical axis and passing through a center of the aperture stop intersects to form a point on an image-side surface of the lens element closest to the side of image, the perpendicular distance from the point to the optical axis is Yc2, half of the diagonal length of the effective pixel area of the electronic sensor is ImgH, and they preferably satisfy the relation: 0.55<Yc2/ImgH<0.95. When the above relation is satisfied, a larger field of view can be achieved for the optical imaging lens assembly, and the angle at which the light is projected onto the sensor from the off-axis field can be favorably reduced to further correct the off-axis aberration.

In the aforementioned optical imaging lens assembly, the focal length of the optical imaging lens assembly is f, the focal length of the second lens element is f2, and they preferably satisfy the relation: −0.22<f/f2<0.0. When the above relation is satisfied, the refractive power of the second lens element is more appropriate, and thereby the sensitivity of the optical system can be favorably attenuated and the high order aberration can be further corrected.

In the aforementioned optical imaging lens assembly, the distance on the optical axis between the object-side surface of the first lens element and the electronic sensor is TTL, half of the diagonal length of the effective pixel area of the electronic sensor is ImgH, and they preferably satisfy the relation: TTL/ImgH<1.95. The satisfaction of the above relation enables the optical imaging lens assembly to maintain a compact form so that it can be installed into compact portable electronic products.

In the present optical imaging lens assembly, the lens elements can be made of glass or plastic material. If the lens elements are made of glass, there is more freedom in distributing the refractive power of the optical system. If plastic material is adopted to produce the lens elements, the production cost will be reduced effectively. Additionally, the surfaces of the lens elements can be aspheric and easily made into non-spherical profiles, allowing more design parameter freedom which can be used to reduce aberration and the number of the lens elements. Consequently, the total track length of the optical imaging lens assembly can be effectively reduced.

In the present optical imaging lens assembly, if a lens element has a convex surface, it means the portion of the surface in proximity to the optical axis is convex; if a lens element has a concave surface, it means the portion of the surface in proximity to the optical axis is concave.

Figure 23:
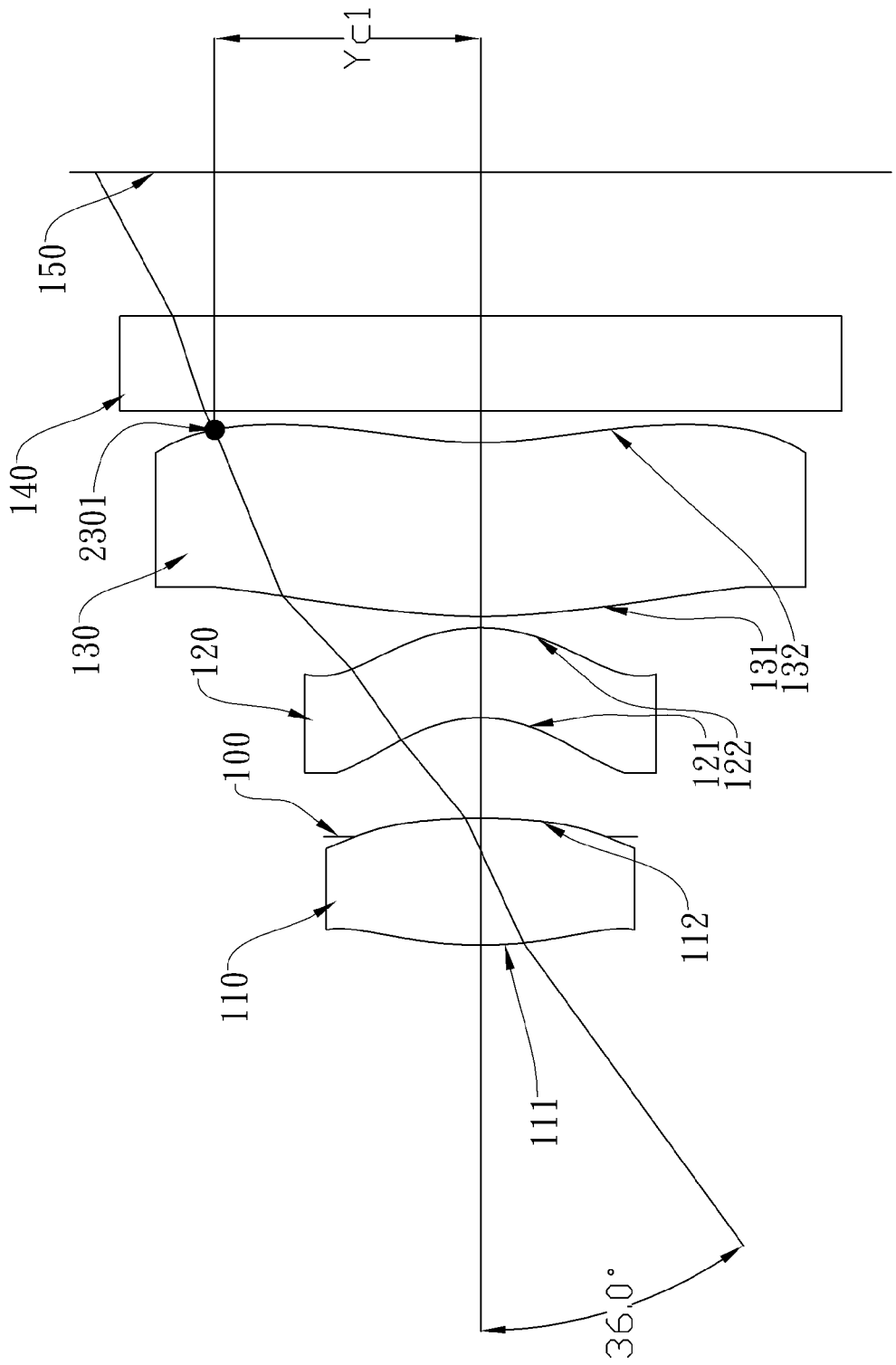
FIG. 23 shows the distance and the relative location represented by Yc1.
Figure 24:
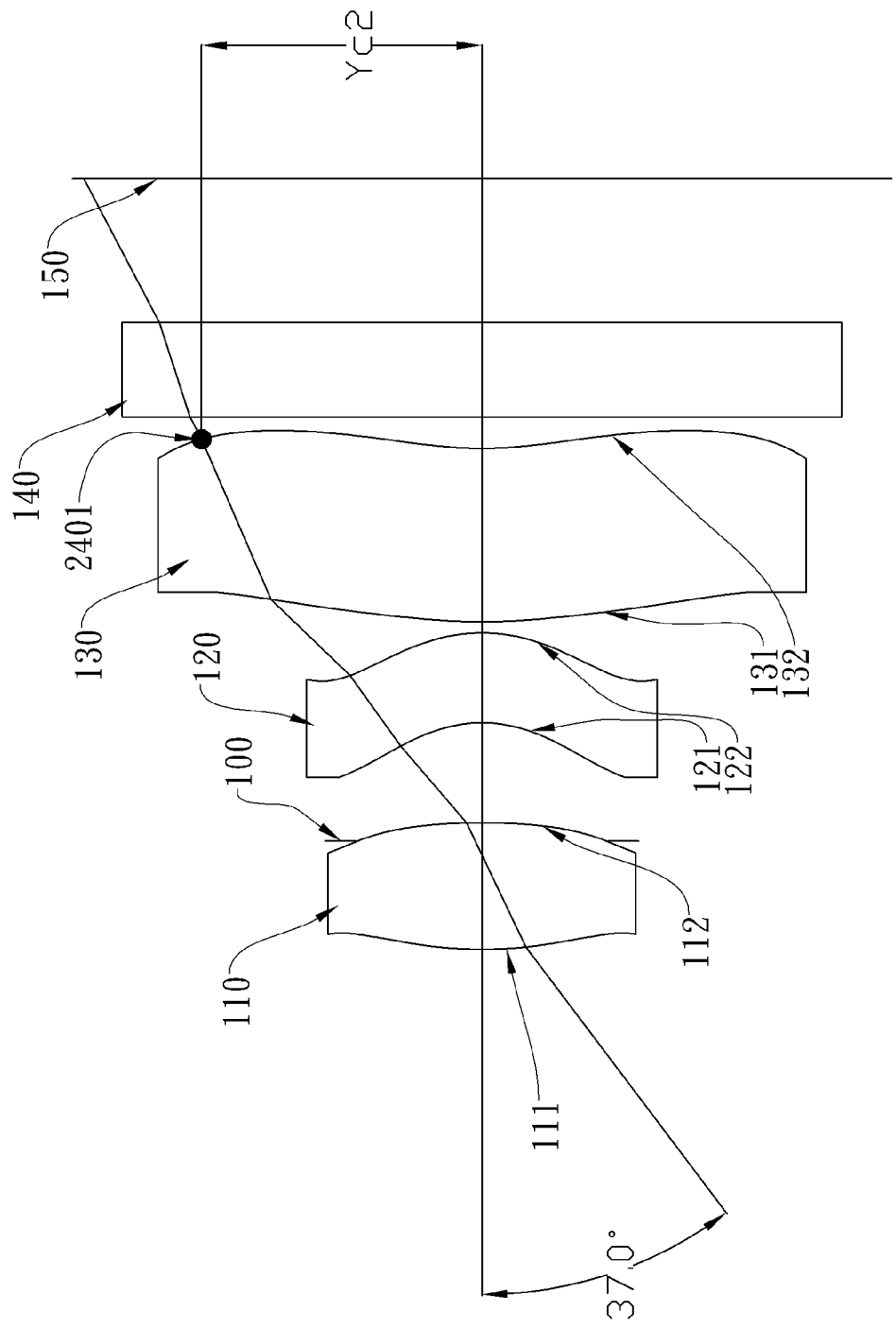
FIG. 24 shows the distance and the relative location represented by Yc2.

In the present optical imaging lens assembly, a light ray having an incident angle of 36 degrees relative to the optical axis and passing through a center of the aperture stop intersects to form a point on an image-side surface of the lens element closest to the side of image, the perpendicular distance from the point to the optical axis is Yc1; a light ray having an incident angle of 37 degrees relative to the optical axis and passing through a center of the aperture stop intersects to form a point on an image-side surface of the lens element closest to the side of image, the perpendicular distance from the point to the optical axis is Yc2. The distances and relative locations represented by Yc1 and Yc2 will be further illustrated in FIGS. 23 and 24, respectively. FIGS. 23 and 24 illustrate the optical system of the first embodiment into which light rays having respective incident angles of 36 and 37 degrees are directed. The light ray having an incident angle of 36 degrees relative to the optical axis and passing through a center of the aperture stop 100 intersects to form a point 2301 on an image-side surface 132 of the lens element 130 closest to the side of image, the perpendicular distance from the point 2301 to the optical axis is Yc1; The light ray having an incident angle of 37 degrees relative to the optical axis and passing through a center of the aperture stop 100 intersects to form a point 2401 on an image-side surface 132 of the lens element 130 closest to the side of image, the perpendicular distance from the point 2401 to the optical axis is Yc2.

Preferred embodiments of the present invention will be described in the following paragraphs by referring to the accompanying drawings.

Figure 1B:
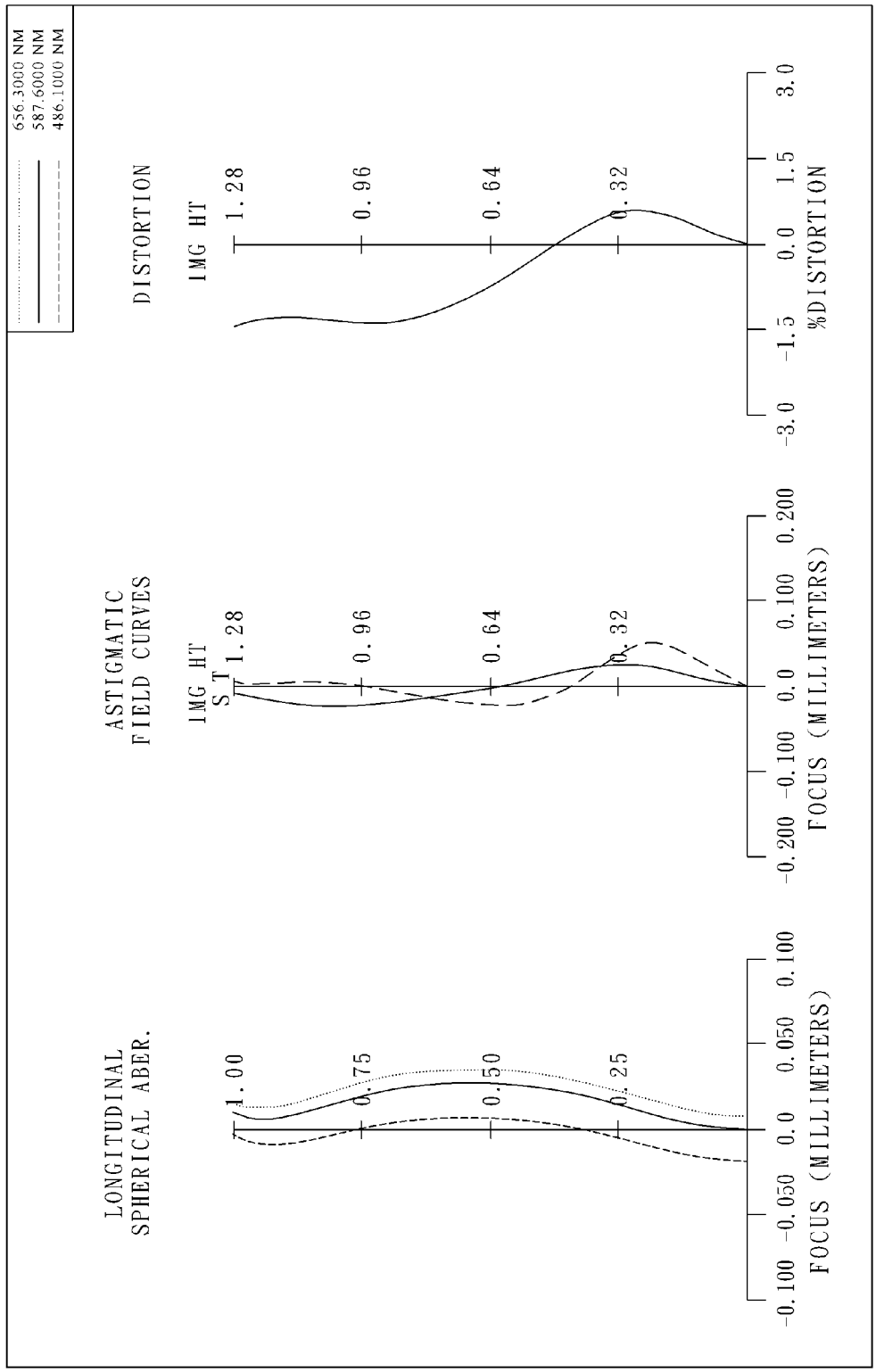
FIG. 1B shows the aberration curves of the first embodiment of the present invention.

FIG. 1A shows an optical imaging lens assembly in accordance with a first embodiment of the present invention, and FIG. 1B shows the aberration curves of the first embodiment of the present invention. In the first embodiment of the present invention, there is provided an optical imaging lens assembly mainly comprising three lens elements, in order from an object side to an image side: a plastic first lens element 110 with positive refractive power having a convex object-side surface 111 and a convex image-side surface 112; a plastic second lens element 120 with negative refractive power having a concave object-side surface 121 and a convex image-side surface 122; and a plastic third lens element 130 with negative refractive power having a convex object-side surface 131 and a concave image-side surface 132 on which at least one inflection point is formed, the object-side and image-side surfaces 131 and 132 thereof being aspheric. Moreover, the optical imaging lens assembly is provided with an aperture stop 100 disposed between the first lens element 110 and the second lens element 120. The optical imaging lens assembly further comprises an IR filter 140 disposed between the image-side surface 132 of the third lens element 130 and an image plane 150; the IR filter 140 is made of glass and has no influence on the focal length of the optical imaging lens assembly.

The equation of the aspheric surface profiles is expressed as follows:

$$X(Y) = (Y^2/R)/(1 + sqrt(1 - (1+k)*(Y/R)^2)) + \sum_i (Ai)*(Y^i)$$

wherein:

X: the height of a point on the aspheric surface at a distance Y from the optical axis relative to the tangential plane at the aspheric surface vertex;

Y: the distance from the point on the curve of the aspheric surface to the optical axis;

k: the conic coefficient;

Ai: the aspheric coefficient of order i.

In the first embodiment of the present optical imaging lens assembly, the focal length of the optical imaging lens assembly is f, and it satisfies the relation: f=1.71 (mm).

In the first embodiment of the present optical imaging lens assembly, the f-number of the optical imaging lens assembly is Fno, and it satisfies the relation: Fno=2.07.

In the first embodiment of the present optical imaging lens assembly, half of the maximal field of view of the optical imaging lens assembly is HFOV, and it satisfies the relation: HFOV=37.5 deg.

In the first embodiment of the present optical imaging lens assembly, the Abbe number of the first lens element 110 is V1, the Abbe number of the second lens element 120 is V2, and they satisfy the relation: V1−V2=32.5.

In the first embodiment of the present optical imaging lens assembly, the thickness of the first lens element 110 on the optical axis is CT1, the thickness of the second lens element 120 on the optical axis is CT2, and they satisfy the relation: CT2/CT1=0.71.

In the first embodiment of the present optical imaging lens assembly, the radius of curvature of the object-side surface 111 of the first lens element 110 is R1, the radius of curvature of the image-side surface 112 of the first lens element 110 is R2, and they satisfy the relation: R1/R2=−0.60.

In the first embodiment of the present optical imaging lens assembly, the focal length of the optical imaging lens assembly is f, the focal length of the first lens element 110 is f1, and they satisfy the relation: f1/f=0.88.

In the first embodiment of the present optical imaging lens assembly, the focal length of the optical imaging lens assembly is f, the focal length of the second lens element 120 is f2, and they satisfy the relation: f/f2=−0.01.

In the first embodiment of the present optical imaging lens assembly, a light ray having an incident angle of 36 degrees relative to the optical axis and passing through a center of the aperture stop 100 intersects to form a point on an image-side surface 132 of the lens element 130 closest to the side of image, the perpendicular distance from the point to the optical axis is Yc1, half of the diagonal length of the effective pixel area of the electronic sensor is ImgH, and they satisfy the relation: Yc1/ImgH=0.65.

In the first embodiment of the present optical imaging lens assembly, a light ray having an incident angle of 37 degrees relative to the optical axis and passing through a center of the aperture stop 100 intersects to form a point on an image-side surface 132 of the lens element 130 closest to the side of image, the perpendicular distance from the point to the optical axis is Yc2, half of the diagonal length of the effective pixel area of the electronic sensor is ImgH, and they satisfy the relation: Yc2/ImgH=0.69.

In the first embodiment of the present optical imaging lens assembly, the distance on the optical axis between the aperture stop 100 and the electronic sensor is SL, the distance on the optical axis between the object-side surface 111 of the first lens element 110 and the electronic sensor is TTL, and they satisfy the relation: SL/TTL=0.85.

In the first embodiment of the present optical imaging lens assembly, the distance on the optical axis between the object-side surface 111 of the first lens element 110 and the electronic sensor is TTL, half of the diagonal length of the effective pixel area of the electronic sensor is ImgH, and they satisfy the relation: TTL/ImgH=1.83.

The detailed optical data of the first embodiment is shown in FIG. 8 (TABLE 1), and the aspheric surface data is shown in FIG. 9 (TABLE 2), wherein the units of the radius of curvature, the thickness and the focal length are expressed in mm, and HFOV is half of the maximal field of view.

Figure 2A:
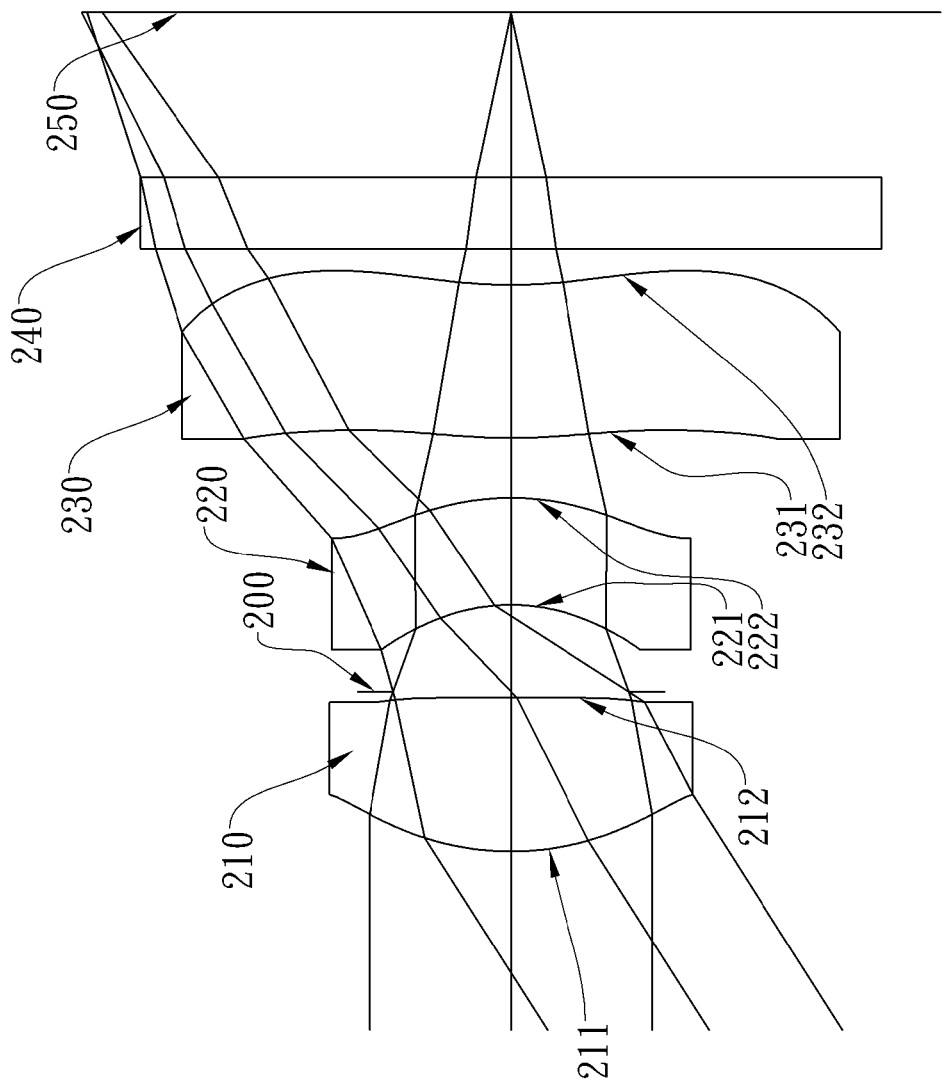
FIG. 2A shows an optical imaging lens assembly in accordance with a second embodiment of the present invention.
Figure 2B:
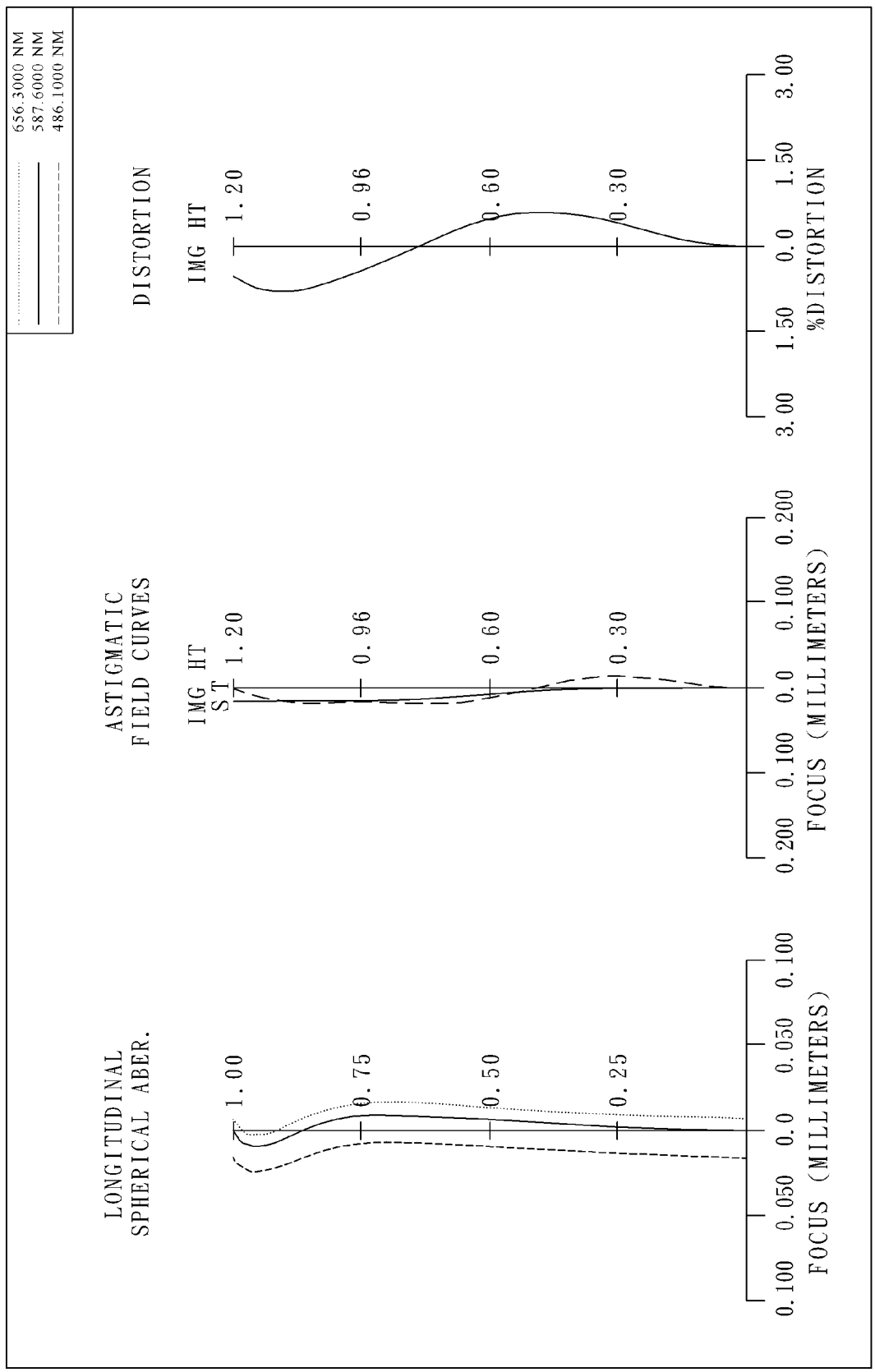
FIG. 2B shows the aberration curves of the second embodiment of the present invention.

FIG. 2A shows an optical imaging lens assembly in accordance with a second embodiment of the present invention, and FIG. 2B shows the aberration curves of the second embodiment of the present invention. In the second embodiment of the present invention, there is provided an optical imaging lens assembly mainly comprising three lens elements, in order from an object side to an image side: a plastic first lens element 210 with positive refractive power having a convex object-side surface 211 and a concave image-side surface 212; a plastic second lens element 220 with negative refractive power having a concave object-side surface 221 and a convex image-side surface 222; and a plastic third lens element 230 with negative refractive power having a convex object-side surface 231 and a concave image-side surface 232 on which at least one inflection point is formed, the object-side and image-side surfaces 231 and 232 thereof being aspheric. Moreover, the optical imaging lens assembly is provided with an aperture stop 200 disposed between the first lens element 210 and the second lens element 220. The optical imaging lens assembly further comprises an IR filter 240 disposed between the image-side surface 232 of the third lens element 230 and an image plane 250; the IR filter 240 is made of glass and has no influence on the focal length of the optical imaging lens assembly.

The equation of the aspheric surface profiles of the second embodiment has the same form as that of the first embodiment.

In the second embodiment of the present optical imaging lens assembly, the focal length of the optical imaging lens assembly is f, and it satisfies the relation: f=1.90 (mm).

In the second embodiment of the present optical imaging lens assembly, the f-number of the optical imaging lens assembly is Fno, and it satisfies the relation: Fno=2.40.

In the second embodiment of the present optical imaging lens assembly, half of the maximal field of view of the optical imaging lens assembly is HFOV, and it satisfies the relation: HFOV=32.5 deg.

In the second embodiment of the present optical imaging lens assembly, the Abbe number of the first lens element 210 is V1, the Abbe number of the second lens element 220 is V2, and they satisfy the relation: V1−V2=32.5.

In the second embodiment of the present optical imaging lens assembly, the thickness of the first lens element 210 on the optical axis is CT1, the thickness of the second lens element 220 on the optical axis is CT2, and they satisfy the relation: CT2/CT1=0.70.

In the second embodiment of the present optical imaging lens assembly, the radius of curvature of the object-side surface 211 of the first lens element 210 is R1, the radius of curvature of the image-side surface 212 of the first lens element 210 is R2, and they satisfy the relation: R1/R2=0.03.

In the second embodiment of the present optical imaging lens assembly, the focal length of the optical imaging lens assembly is f, the focal length of the first lens element 210 is f1, and they satisfy the relation: f1/f=0.77.

In the second embodiment of the present optical imaging lens assembly, the focal length of the optical imaging lens assembly is f, the focal length of the second lens element 220 is f2, and they satisfy the relation: f/f2=−0.28.

In the second embodiment of the present optical imaging lens assembly, the distance on the optical axis between the aperture stop 200 and the electronic sensor is SL, the distance on the optical axis between the object-side surface 211 of the first lens element 210 and the electronic sensor is TTL, and they satisfy the relation: SL/TTL=0.80.

In the second embodiment of the present optical imaging lens assembly, the distance on the optical axis between the object-side surface 211 of the first lens element 210 and the electronic sensor is TTL, half of the diagonal length of the effective pixel area of the electronic sensor is ImgH, and they satisfy the relation: TTL/ImgH=1.90.

The detailed optical data of the second embodiment is shown in FIG. 10 (TABLE 3), and the aspheric surface data is shown in FIG. 11 (TABLE 4), wherein the units of the radius of curvature, the thickness and the focal length are expressed in mm, and HFOV is half of the maximal field of view.

Figure 3A:
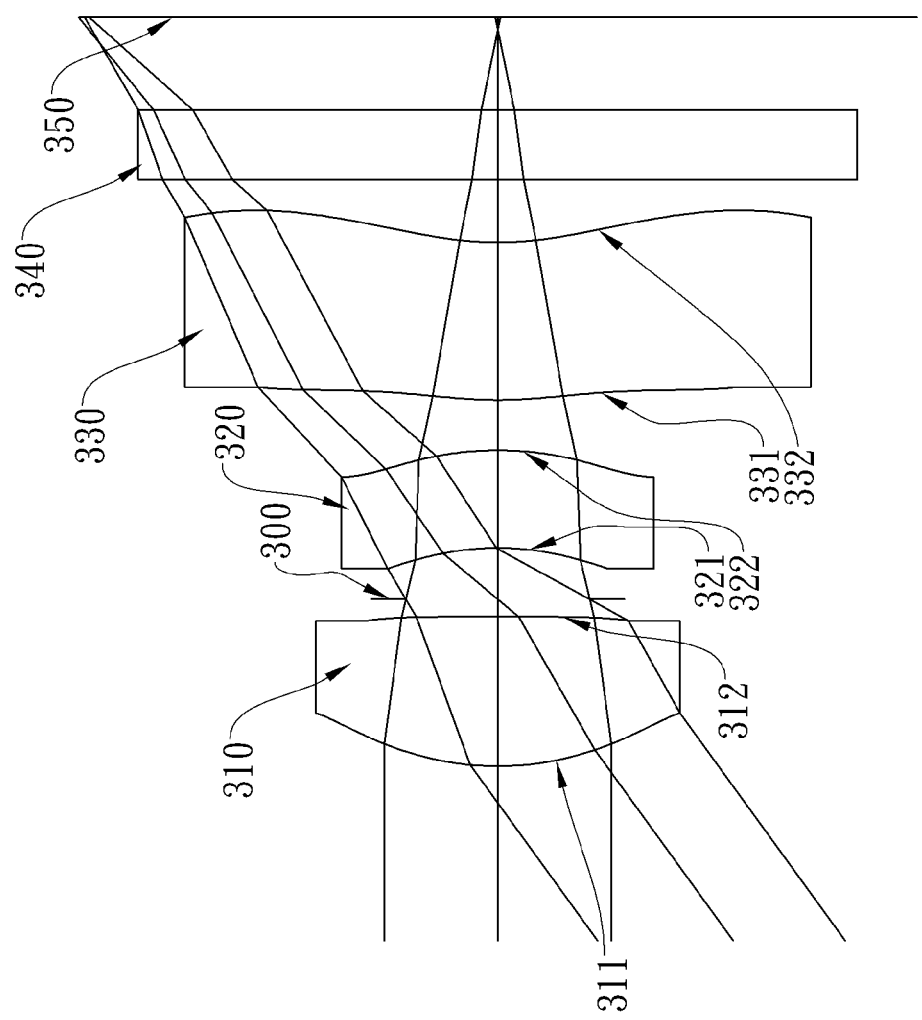
FIG. 3A shows an optical imaging lens assembly in accordance with a third embodiment of the present invention.
Figure 3B:
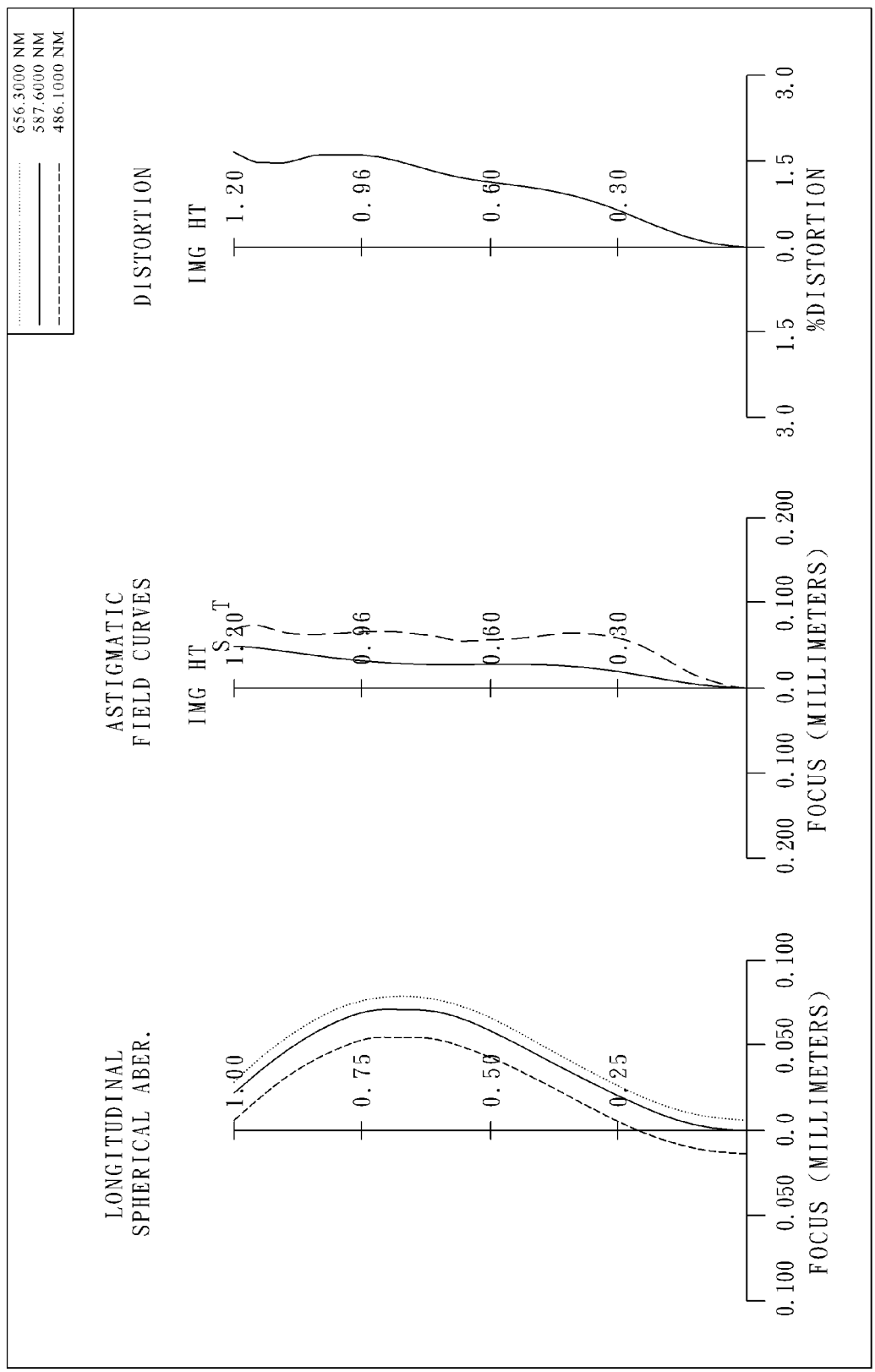
FIG. 3B shows the aberration curves of the third embodiment of the present invention.

FIG. 3A shows an optical imaging lens assembly in accordance with a third embodiment of the present invention, and FIG. 3B shows the aberration curves of the third embodiment of the present invention. In the third embodiment of the present invention, there is provided an optical imaging lens assembly mainly comprising three lens elements, in order from an object side to an image side: a plastic first lens element 310 with positive refractive power having a convex object-side surface 311 and a convex image-side surface 312; a plastic second lens element 320 with negative refractive power having a concave object-side surface 321 and a convex image-side surface 322; and a plastic third lens element 330 with negative refractive power having a convex object-side surface 331 and a concave image-side surface 332 on which at least one inflection point is formed, the object-side and image-side surfaces 331 and 332 thereof being aspheric. Moreover, the optical imaging lens assembly is provided with an aperture stop 300 disposed between the first lens element 310 and the second lens element 320. The optical imaging lens assembly further comprises an IR filter 340 disposed between the image-side surface 332 of the third lens element 330 and an image plane 350; the IR filter 340 is made of glass and has no influence on the focal length of the optical imaging lens assembly.

The equation of the aspheric surface profiles of the third embodiment has the same form as that of the first embodiment.

In the third embodiment of the present optical imaging lens assembly, the focal length of the optical imaging lens assembly is f, and it satisfies the relation: f=1.65 (mm).

In the third embodiment of the present optical imaging lens assembly, the f-number of the optical imaging lens assembly is Fno, and it satisfies the relation: Fno=2.40.

In the third embodiment of the present optical imaging lens assembly, half of the maximal field of view of the optical imaging lens assembly is HFOV, and it satisfies the relation: HFOV=35.9 deg.

In the third embodiment of the present optical imaging lens assembly, the Abbe number of the first lens element 310 is V1, the Abbe number of the second lens element 320 is V2, and they satisfy the relation: V1−V2=29.3.

In the third embodiment of the present optical imaging lens assembly, the thickness of the first lens element 310 on the optical axis is CT1, the thickness of the second lens element 320 on the optical axis is CT2, and they satisfy the relation: CT2/CT1=0.65.

In the third embodiment of the present optical imaging lens assembly, the radius of curvature of the object-side surface 311 of the first lens element 310 is R1, the radius of curvature of the image-side surface 312 of the first lens element 310 is R2, and they satisfy the relation: R1/R2=0.00.

In the third embodiment of the present optical imaging lens assembly, the focal length of the optical imaging lens assembly is f, the focal length of the first lens element 310 is f1, and they satisfy the relation: f1/f=0.92.

In the third embodiment of the present optical imaging lens assembly, the focal length of the optical imaging lens assembly is f, the focal length of the second lens element 320 is f2, and they satisfy the relation: f/f2=−0.08.

In the third embodiment of the present optical imaging lens assembly, the distance on the optical axis between the aperture stop 300 and the electronic sensor is SL, the distance on the optical axis between the object-side surface 311 of the first lens element 310 and the electronic sensor is TTL, and they satisfy the relation: SL/TTL=0.77.

In the third embodiment of the present optical imaging lens assembly, the distance on the optical axis between the object-side surface 311 of the first lens element 310 and the electronic sensor is TTL, half of the diagonal length of the effective pixel area of the electronic sensor is ImgH, and they satisfy the relation: TTL/ImgH=1.73.

The detailed optical data of the third embodiment is shown in FIG. 12 (TABLE 5), and the aspheric surface data is shown in FIG. 13 (TABLE 6), wherein the units of the radius of curvature, the thickness and the focal length are expressed in mm, and HFOV is half of the maximal field of view.

Figure 4A:
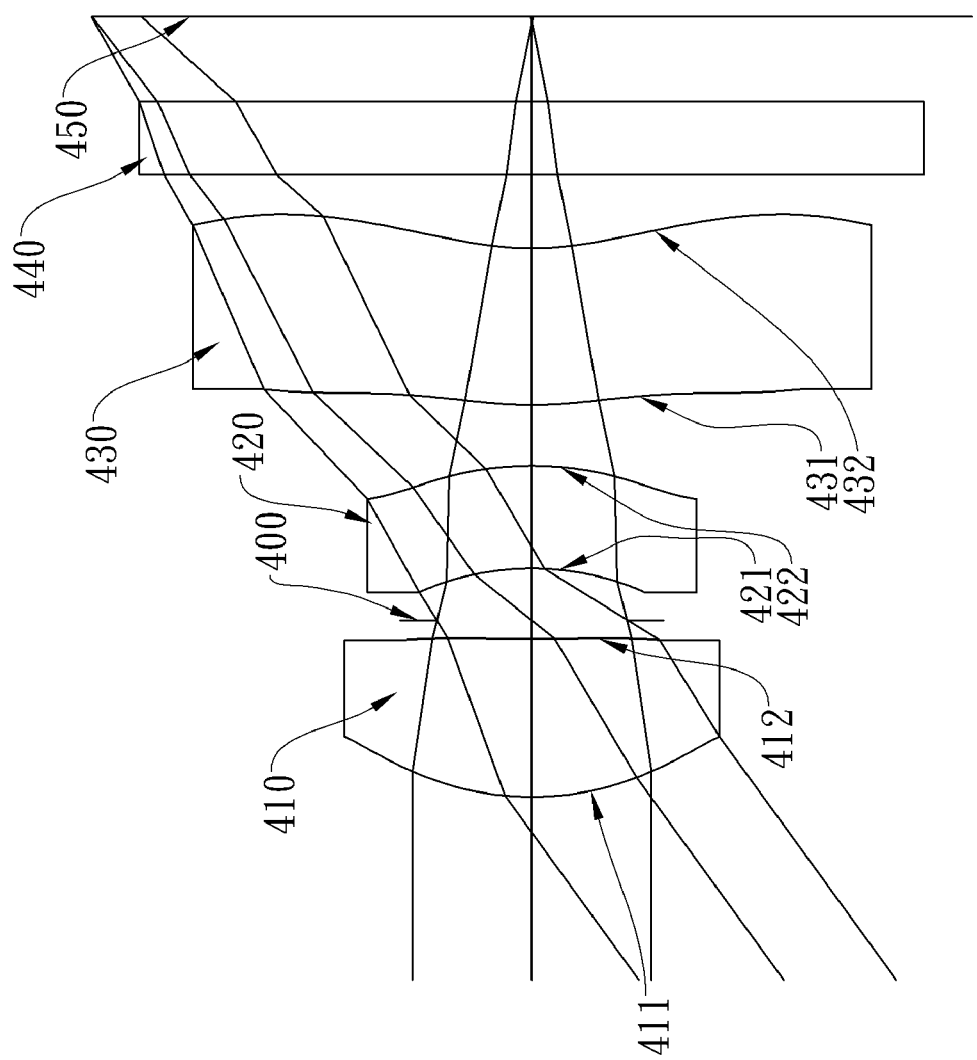
FIG. 4A shows an optical imaging lens assembly in accordance with a fourth embodiment of the present invention.
Figure 4B:
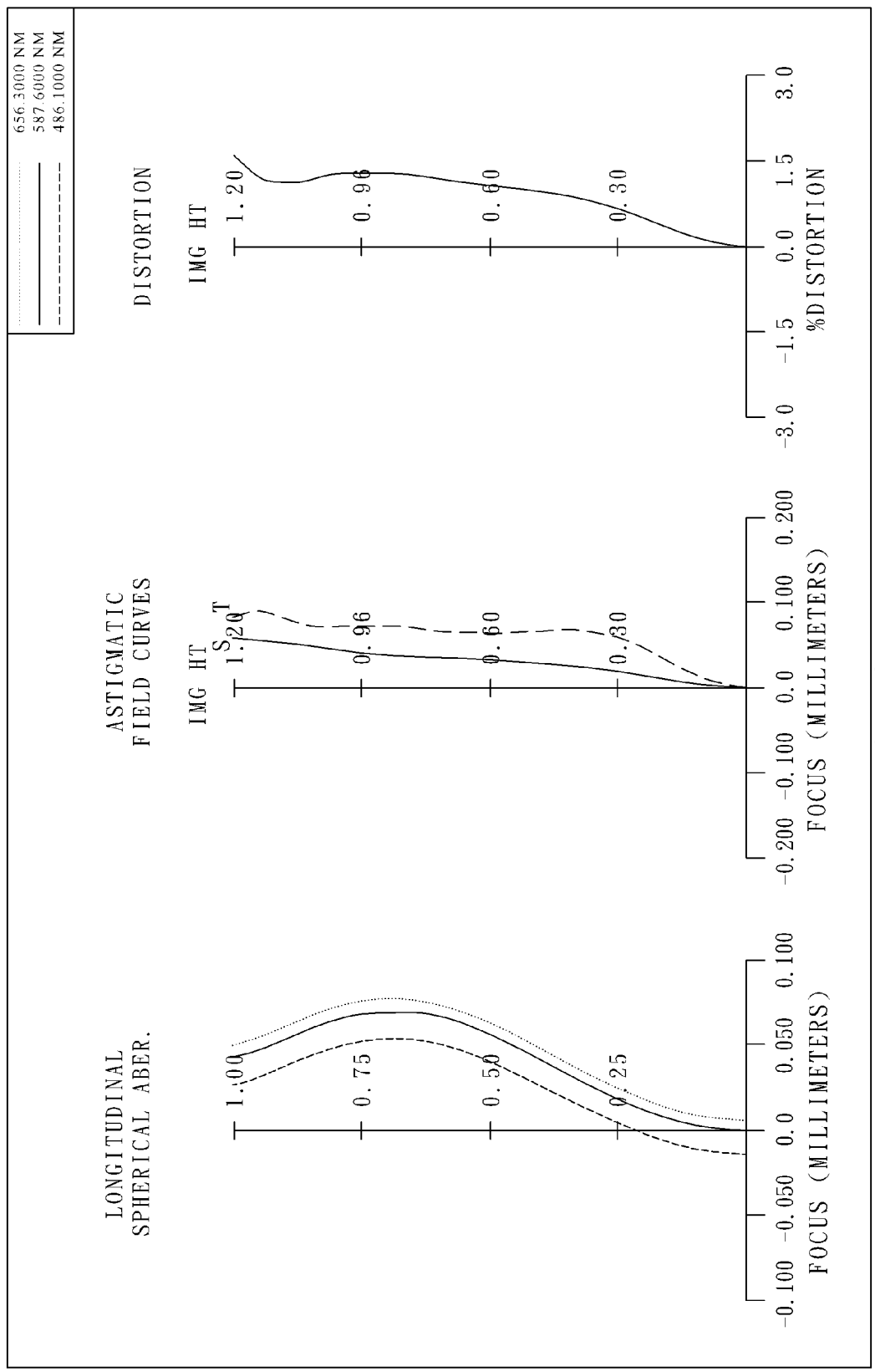
FIG. 4B shows the aberration curves of the fourth embodiment of the present invention.

FIG. 4A shows an optical imaging lens assembly in accordance with a fourth embodiment of the present invention, and FIG. 4B shows the aberration curves of the fourth embodiment of the present invention. In the fourth embodiment of the present invention, there is provided an optical imaging lens assembly mainly comprising three lens elements, in order from an object side to an image side: a plastic first lens element 410 with positive refractive power having a convex object-side surface 411 and a concave image-side surface 412; a plastic second lens element 420 with negative refractive power having a concave object-side surface 421 and a convex image-side surface 422; and a plastic third lens element 430 with negative refractive power having a convex object-side surface 431 and a concave image-side surface 432 on which at least one inflection point is formed, the object-side and image-side surfaces 431 and 432 thereof being aspheric. Moreover, the optical imaging lens assembly is provided with an aperture stop 400 disposed between the first lens element 410 and the second lens element 420. The optical imaging lens assembly further comprises an IR filter 440 disposed between the image-side surface 432 of the third lens element 430 and an image plane 450; the IR filter 440 is made of glass and has no influence on the focal length of the optical imaging lens assembly.

The equation of the aspheric surface profiles of the fourth embodiment has the same form as that of the first embodiment.

In the fourth embodiment of the present optical imaging lens assembly, the focal length of the optical imaging lens assembly is f, and it satisfies the relation: f=1.65 (mm).

In the fourth embodiment of the present optical imaging lens assembly, the f-number of the optical imaging lens assembly is Fno, and it satisfies the relation: Fno=2.40.

In the fourth embodiment of the present optical imaging lens assembly, half of the maximal field of view of the optical imaging lens assembly is HFOV, and it satisfies the relation: HFOV=36.0 deg.

In the fourth embodiment of the present optical imaging lens assembly, the Abbe number of the first lens element 410 is V1, the Abbe number of the second lens element 420 is V2, and they satisfy the relation: V1−V2=29.3.

In the fourth embodiment of the present optical imaging lens assembly, the thickness of the first lens element 410 on the optical axis is CT1, the thickness of the second lens element 420 on the optical axis is CT2, and they satisfy the relation: CT2/CT1=0.65.

In the fourth embodiment of the present optical imaging lens assembly, the radius of curvature of the object-side surface 411 of the first lens element 410 is R1, the radius of curvature of the image-side surface 412 of the first lens element 410 is R2, and they satisfy the relation: R1/R2=0.07.

In the fourth embodiment of the present optical imaging lens assembly, the focal length of the optical imaging lens assembly is f, the focal length of the first lens element 410 is f1, and they satisfy the relation: f1/f=0.92.

In the fourth embodiment of the present optical imaging lens assembly, the focal length of the optical imaging lens assembly is f, the focal length of the second lens element 420 is f2, and they satisfy the relation: f/f2=−0.10.

In the fourth embodiment of the present optical imaging lens assembly, a light ray having an incident angle of 36 degrees relative to the optical axis and passing through a center of the aperture stop 400 intersects to form a point on an image-side surface 432 of the lens element 430 closest to the side of image, the perpendicular distance from the point to the optical axis is Yc1, half of the diagonal length of the effective pixel area of the electronic sensor is ImgH, and they satisfy the relation: Yc1/ImgH=0.70.

In the fourth embodiment of the present optical imaging lens assembly, the distance on the optical axis between the aperture stop 400 and the electronic sensor is SL, the distance on the optical axis between the object-side surface 411 of the first lens element 410 and the electronic sensor is TTL, and they satisfy the relation: SL/TTL=0.77.

In the fourth embodiment of the present optical imaging lens assembly, the distance on the optical axis between the object-side surface 411 of the first lens element 410 and the electronic sensor is TTL, half of the diagonal length of the effective pixel area of the electronic sensor is ImgH, and they satisfy the relation: TTL/ImgH=1.72.

The detailed optical data of the fourth embodiment is shown in FIG. 14 (TABLE 7), and the aspheric surface data is shown in FIG. 15 (TABLE 8), wherein the units of the radius of curvature, the thickness and the focal length are expressed in mm, and HFOV is half of the maximal field of view.

Figure 5A:
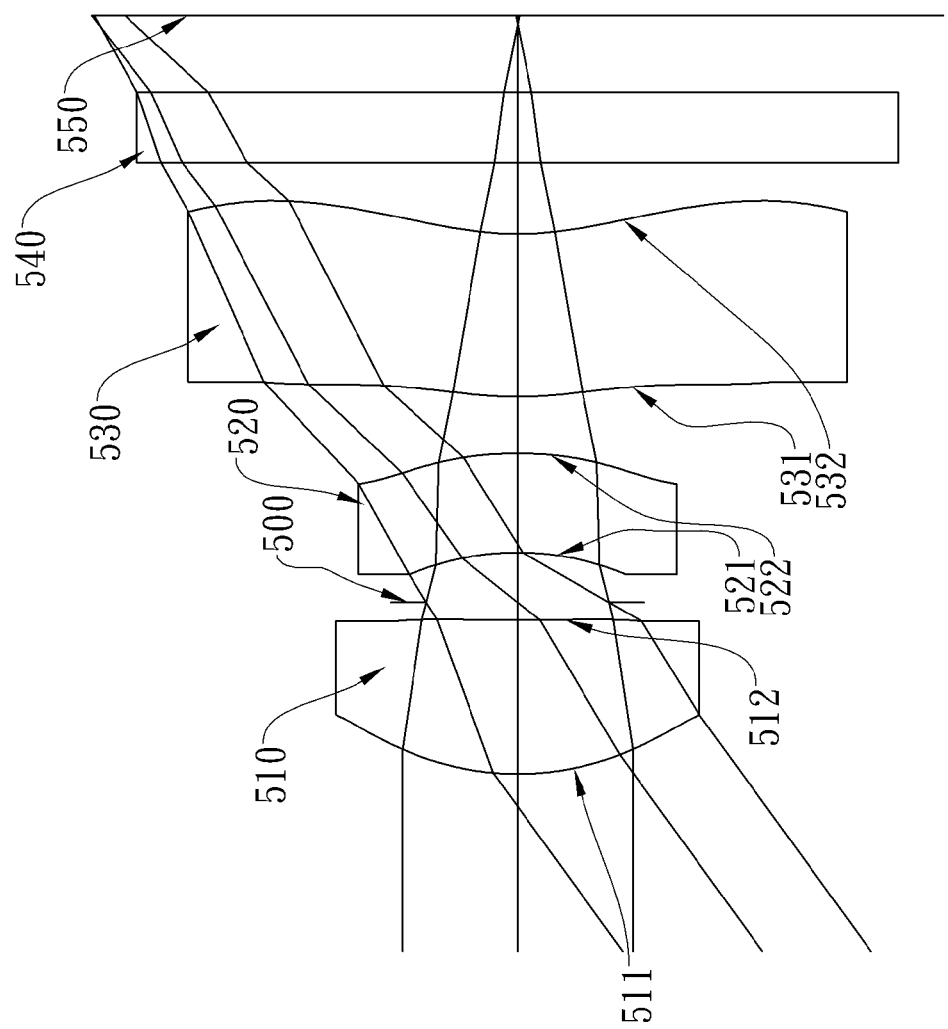
FIG. 5A shows an optical imaging lens assembly in accordance with a fifth embodiment of the present invention.
Figure 5B:
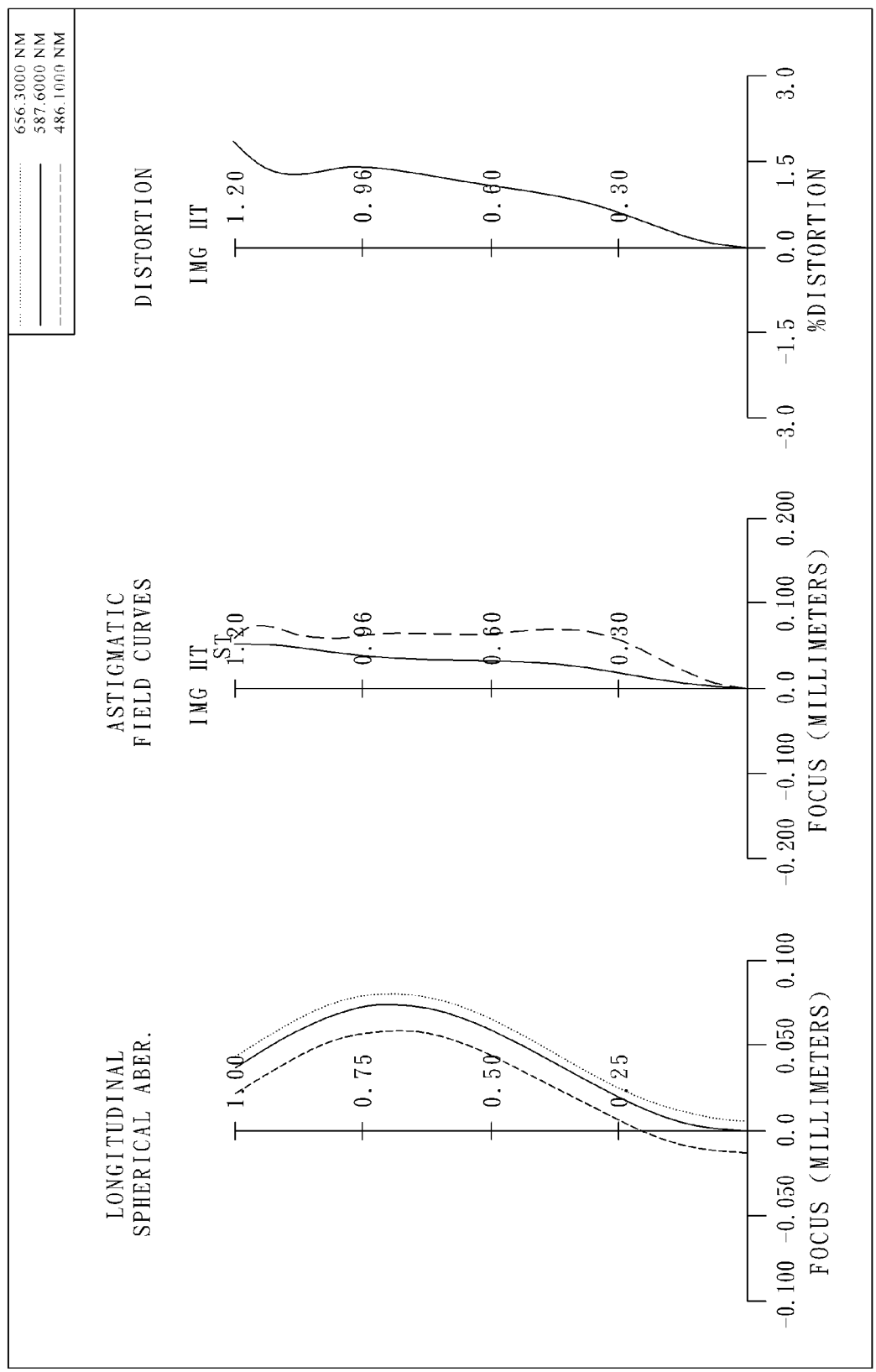
FIG. 5B shows the aberration curves of the fifth embodiment of the present invention.

FIG. 5A shows an optical imaging lens assembly in accordance with a fifth embodiment of the present invention, and FIG. 5B shows the aberration curves of the fifth embodiment of the present invention. In the fifth embodiment of the present invention, there is provided an optical imaging lens assembly mainly comprising three lens elements, in order from an object side to an image side: a plastic first lens element 510 with positive refractive power having a convex object-side surface 511 and a concave image-side surface 512; a plastic second lens element 520 with negative refractive power having a concave object-side surface 521 and a convex image-side surface 522; and a plastic third lens element 530 with positive refractive power having a convex object-side surface 531 and a concave image-side surface 532 on which at least one inflection point is formed, the object-side and image-side surfaces 531 and 532 thereof being aspheric. Moreover, the optical imaging lens assembly is provided with an aperture stop 500 disposed between the first lens element 510 and the second lens element 520. The optical imaging lens assembly further comprises an IR filter 540 disposed between the image-side surface 532 of the third lens element 530 and an image plane 550; the IR filter 540 is made of glass and has no influence on the focal length of the optical imaging lens assembly.

The equation of the aspheric surface profiles of the fifth embodiment has the same form as that of the first embodiment.

In the fifth embodiment of the present optical imaging lens assembly, the focal length of the optical imaging lens assembly is f, and it satisfies the relation: f=1.65 (mm).

In the fifth embodiment of the present optical imaging lens assembly, the f-number of the optical imaging lens assembly is Fno, and it satisfies the relation: Fno=2.40.

In the fifth embodiment of the present optical imaging lens assembly, half of the maximal field of view of the optical imaging lens assembly is HFOV, and it satisfies the relation: HFOV=36.0 deg.

In the fifth embodiment of the present optical imaging lens assembly, the Abbe number of the first lens element 510 is V1, the Abbe number of the second lens element 520 is V2, and they satisfy the relation: V1−V2=29.3.

In the fifth embodiment of the present optical imaging lens assembly, the thickness of the first lens element 510 on the optical axis is CT1, the thickness of the second lens element 520 on the optical axis is CT2, and they satisfy the relation: CT2/CT1=0.65.

In the fifth embodiment of the present optical imaging lens assembly, the radius of curvature of the object-side surface 511 of the first lens element 510 is R1, the radius of curvature of the image-side surface 512 of the first lens element 510 is R2, and they satisfy the relation: R1/R2=0.08.

In the fifth embodiment of the present optical imaging lens assembly, the focal length of the optical imaging lens assembly is f, the focal length of the first lens element 510 is f1, and they satisfy the relation: f1/f=0.92.

In the fifth embodiment of the present optical imaging lens assembly, the focal length of the optical imaging lens assembly is f, the focal length of the second lens element 520 is f2, and they satisfy the relation: f/f2=−0.17.

In the fifth embodiment of the present optical imaging lens assembly, a light ray having an incident angle of 36 degrees relative to the optical axis and passing through a center of the aperture stop 500 intersects to form a point on an image-side surface 532 of the lens element 530 closest to the side of image, the perpendicular distance from the point to the optical axis is Yc1, half of the diagonal length of the effective pixel area of the electronic sensor is ImgH, and they satisfy the relation: Yc1/ImgH=0.71.

In the fifth embodiment of the present optical imaging lens assembly, the distance on the optical axis between the aperture stop 500 and the electronic sensor is SL, the distance on the optical axis between the object-side surface 511 of the first lens element 510 and the electronic sensor is TTL, and they satisfy the relation: SL/TTL=0.77.

In the fifth embodiment of the present optical imaging lens assembly, the distance on the optical axis between the object-side surface 511 of the first lens element 510 and the electronic sensor is TTL, half of the diagonal length of the effective pixel area of the electronic sensor is ImgH, and they satisfy the relation: TTL/ImgH=1.73.

The detailed optical data of the fifth embodiment is shown in FIG. 16 (TABLE 9), and the aspheric surface data is shown in FIG. 17 (TABLE 10), wherein the units of the radius of curvature, the thickness and the focal length are expressed in mm, and HFOV is half of the maximal field of view.

Figure 6A:
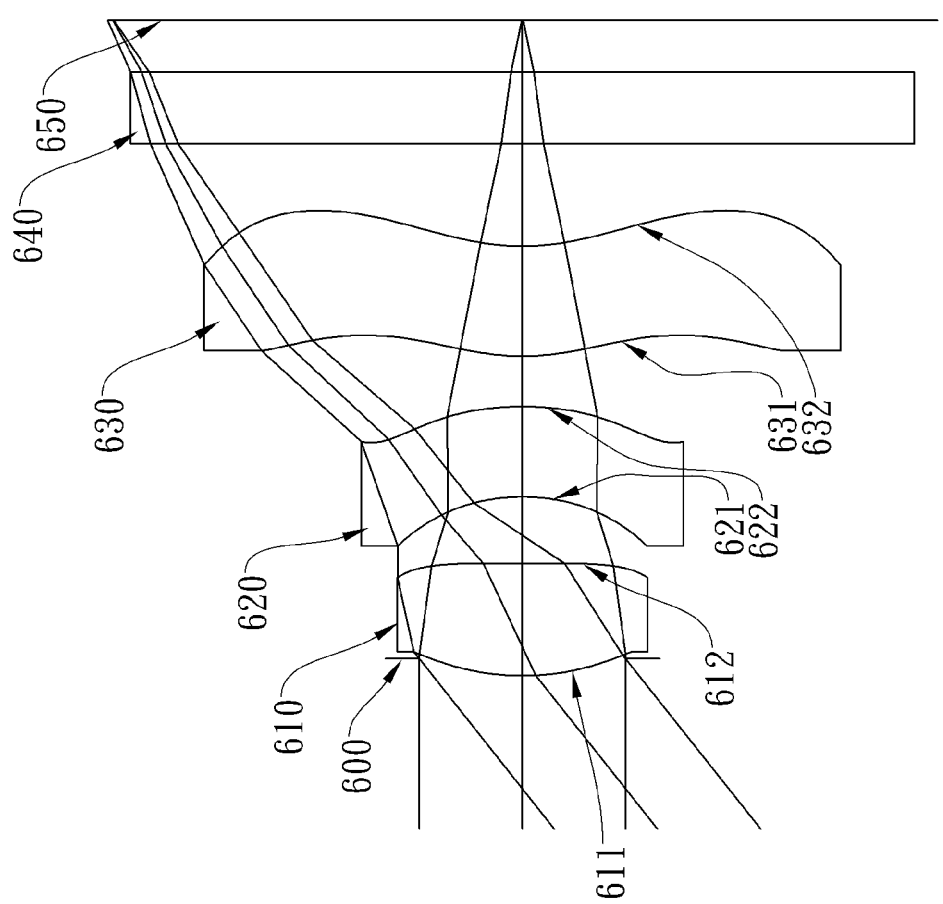
FIG. 6A shows an optical imaging lens assembly in accordance with a sixth embodiment of the present invention.
Figure 6B:
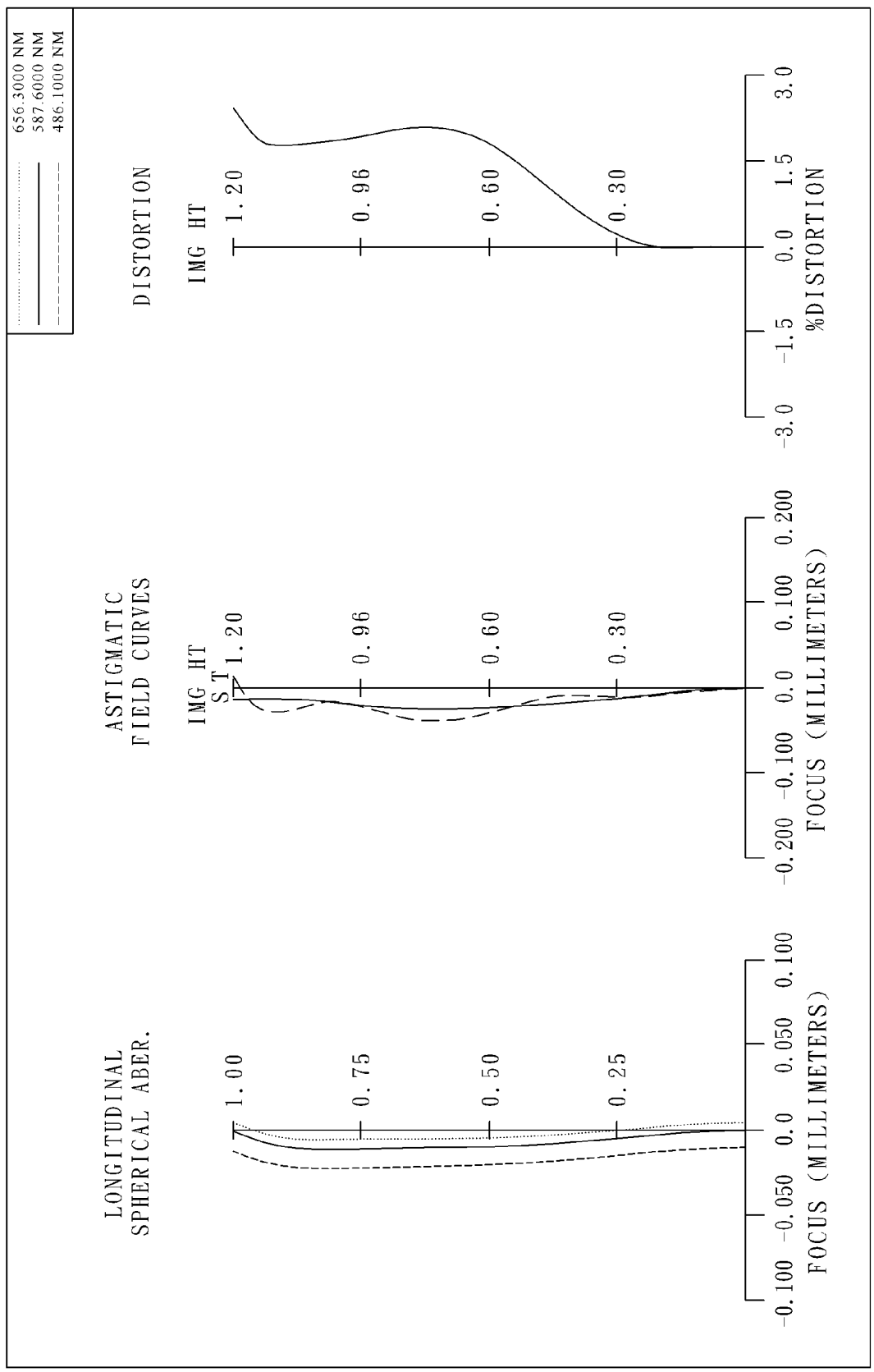
FIG. 6B shows the aberration curves of the sixth embodiment of the present invention.

FIG. 6A shows an optical imaging lens assembly in accordance with a sixth embodiment of the present invention, and FIG. 6B shows the aberration curves of the sixth embodiment of the present invention. In the sixth embodiment of the present invention, there is provided an optical imaging lens assembly mainly comprising three lens elements, in order from an object side to an image side: a plastic first lens element 610 with positive refractive power having a convex object-side surface 611 and a concave image-side surface 612; a plastic second lens element 620 with negative refractive power having a concave object-side surface 621 and a convex image-side surface 622; and a plastic third lens element 630 with positive refractive power having a convex object-side surface 631 and a concave image-side surface 632 on which at least one inflection point is formed, the object-side and image-side surfaces 631 and 632 thereof being aspheric. Moreover, the optical imaging lens assembly is provided with an aperture stop 600 disposed between an object and the first lens element 610. The optical imaging lens assembly further comprises an IR filter 640 disposed between the image-side surface 632 of the third lens element 630 and an image plane 650; the IR filter 640 is made of glass and has no influence on the focal length of the optical imaging lens assembly.

The equation of the aspheric surface profiles of the sixth embodiment has the same form as that of the first embodiment.

In the sixth embodiment of the present optical imaging lens assembly, the focal length of the optical imaging lens assembly is f, and it satisfies the relation: f=1.48 (mm).

In the sixth embodiment of the present optical imaging lens assembly, the f-number of the optical imaging lens assembly is Fno, and it satisfies the relation: Fno=2.46.

In the sixth embodiment of the present optical imaging lens assembly, half of the maximal field of view of the optical imaging lens assembly is HFOV, and it satisfies the relation: HFOV=38.4 deg.

In the sixth embodiment of the present optical imaging lens assembly, the Abbe number of the first lens element 610 is V1, the Abbe number of the second lens element 620 is V2, and they satisfy the relation: V1−V2=32.1.

In the sixth embodiment of the present optical imaging lens assembly, the thickness of the first lens element 610 on the optical axis is CT1, the thickness of the second lens element 620 on the optical axis is CT2, and they satisfy the relation: CT2/CT1=0.80.

In the sixth embodiment of the present optical imaging lens assembly, the radius of curvature of the object-side surface 611 of the first lens element 610 is R1, the radius of curvature of the image-side surface 612 of the first lens element 610 is R2, and they satisfy the relation: R1/R2=0.01.

In the sixth embodiment of the present optical imaging lens assembly, the focal length of the optical imaging lens assembly is f, the focal length of the first lens element 610 is f1, and they satisfy the relation: f1/f=0.89.

In the sixth embodiment of the present optical imaging lens assembly, the focal length of the optical imaging lens assembly is f, the focal length of the second lens element 620 is f2, and they satisfy the relation: f/f2=−0.39.

In the sixth embodiment of the present optical imaging lens assembly, a light ray having an incident angle of 36 degrees relative to the optical axis and passing through a center of the aperture stop 600 intersects to form a point on an image-side surface 632 of the lens element 630 closest to the side of image, the perpendicular distance from the point to the optical axis is Yc1, half of the diagonal length of the effective pixel area of the electronic sensor is ImgH, and they satisfy the relation: Yc1/ImgH=0.66.

In the sixth embodiment of the present optical imaging lens assembly, a light ray having an incident angle of 37 degrees relative to the optical axis and passing through a center of the aperture stop 600 intersects to form a point on an image-side surface 632 of the lens element 630 closest to the side of image, the perpendicular distance from the point to the optical axis is Yc2, half of the diagonal length of the effective pixel area of the electronic sensor is ImgH, and they satisfy the relation: Yc2/ImgH=0.69.

In the sixth embodiment of the present optical imaging lens assembly, the distance on the optical axis between the aperture stop 600 and the electronic sensor is SL, the distance on the optical axis between the object-side surface 611 of the first lens element 610 and the electronic sensor is TTL, and they satisfy the relation: SL/TTL=0.97.

In the sixth embodiment of the present optical imaging lens assembly, the distance on the optical axis between the object-side surface 611 of the first lens element 610 and the electronic sensor is TTL, half of the diagonal length of the effective pixel area of the electronic sensor is ImgH, and they satisfy the relation: TTL/ImgH=1.54.

The detailed optical data of the sixth embodiment is shown in FIG. 18 (TABLE 11), and the aspheric surface data is shown in FIG. 19 (TABLE 12), wherein the units of the radius of curvature, the thickness and the focal length are expressed in mm, and HFOV is half of the maximal field of view.

Figure 7A:
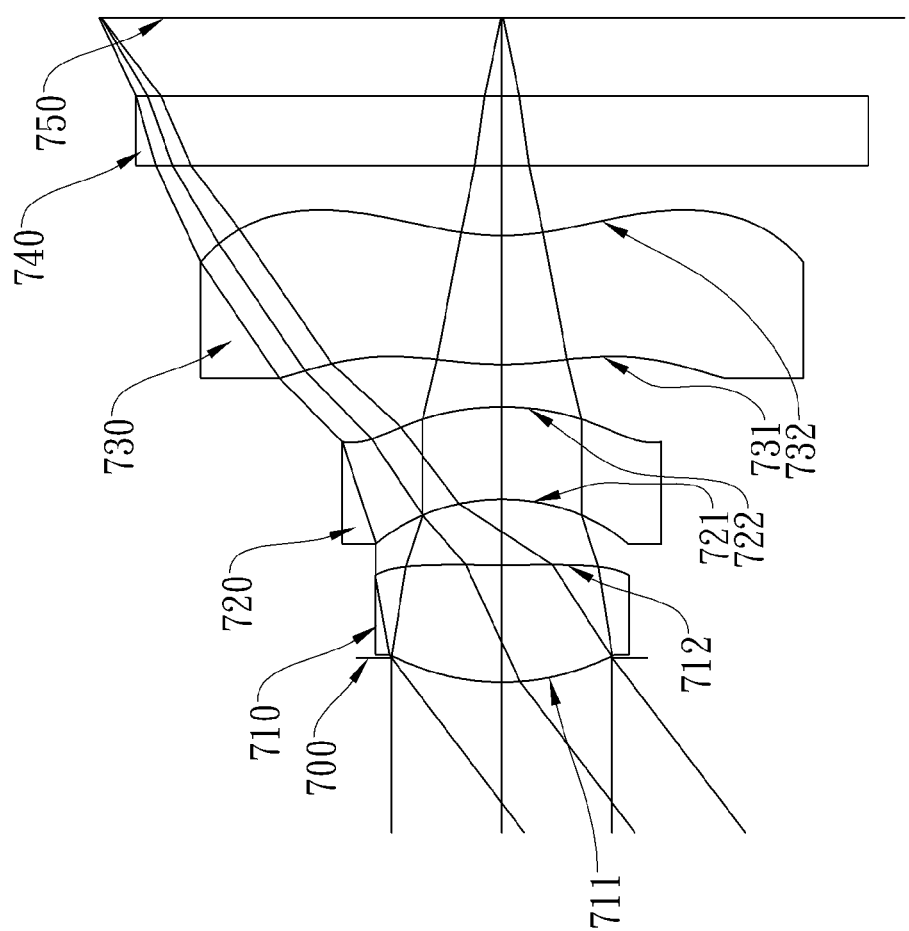
FIG. 7A shows an optical imaging lens assembly in accordance with a seventh embodiment of the present invention.
Figure 7B:
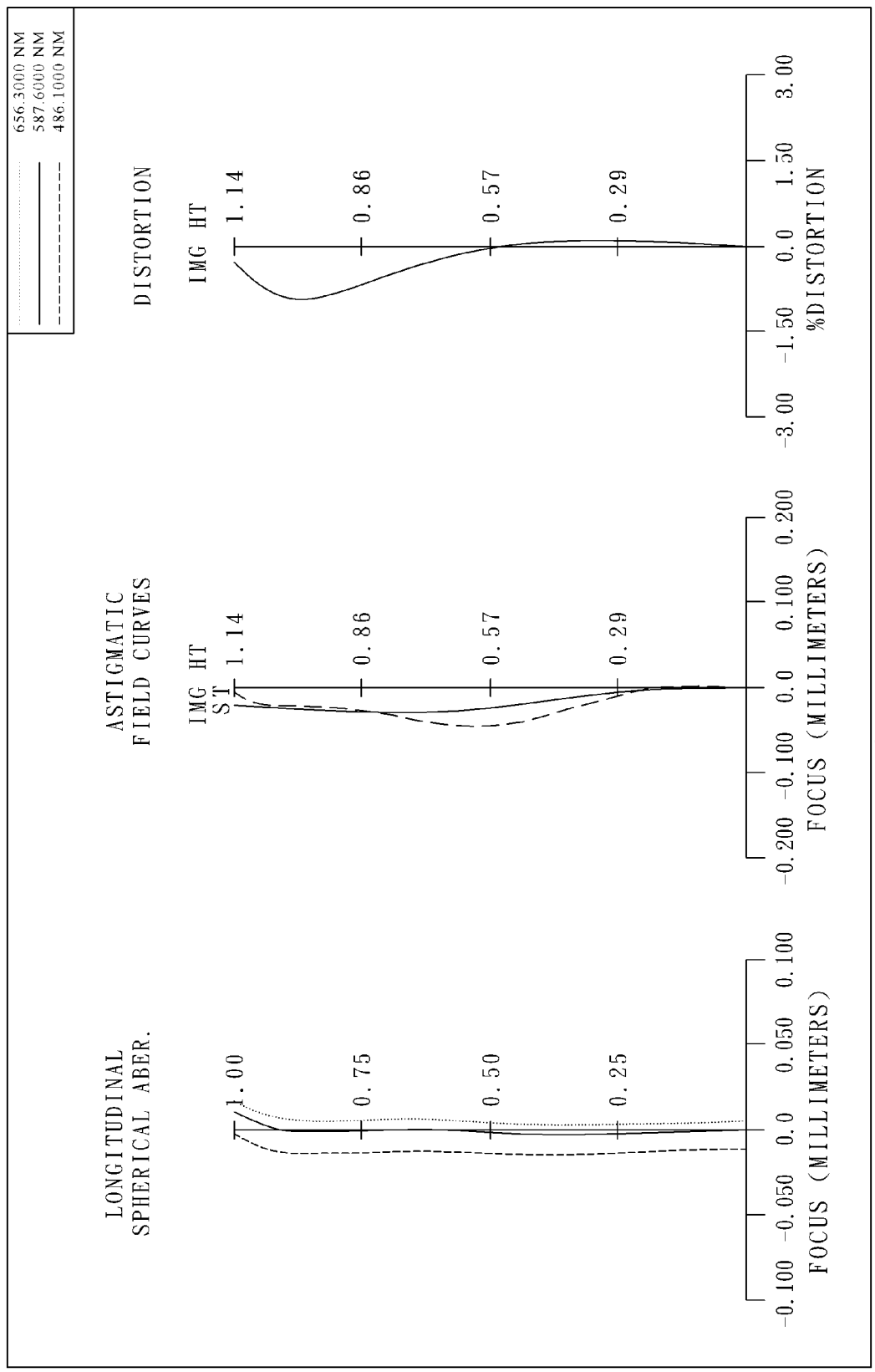
FIG. 7B shows the aberration curves of the seventh embodiment of the present invention.

FIG. 7A shows an optical imaging lens assembly in accordance with a seventh embodiment of the present invention, and FIG. 7B shows the aberration curves of the seventh embodiment of the present invention. In the seventh embodiment of the present invention, there is provided an optical imaging lens assembly mainly comprising three lens elements, in order from an object side to an image side: a plastic first lens element 710 with positive refractive power having a convex object-side surface 711 and a concave image-side surface 712; a plastic second lens element 720 with negative refractive power having a concave object-side surface 721 and a convex image-side surface 722; and a plastic third lens element 730 with negative refractive power having a convex object-side surface 731 and a concave image-side surface 732 on which at least one inflection point is formed, the object-side and image-side surfaces 731 and 732 thereof being aspheric. Moreover, the optical imaging lens assembly is provided with an aperture stop 700 disposed between an object and the first lens element 710. The optical imaging lens assembly further comprises an IR filter 740 disposed between the image-side surface 732 of the third lens element 730 and an image plane 750; the IR filter 740 is made of glass and has no influence on the focal length of the optical imaging lens assembly.

The equation of the aspheric surface profiles of the seventh embodiment has the same form as that of the first embodiment.

In the seventh embodiment of the present optical imaging lens assembly, the focal length of the optical imaging lens assembly is f, and it satisfies the relation: f=1.52 (mm).

In the seventh embodiment of the present optical imaging lens assembly, the f-number of the optical imaging lens assembly is Fno, and it satisfies the relation: Fno=2.40.

In the seventh embodiment of the present optical imaging lens assembly, half of the maximal field of view of the optical imaging lens assembly is HFOV, and it satisfies the relation: HFOV=37.2 deg.

In the seventh embodiment of the present optical imaging lens assembly, the Abbe number of the first lens element 710 is V1, the Abbe number of the second lens element 720 is V2, and they satisfy the relation: V1−V2=34.5.

In the seventh embodiment of the present optical imaging lens assembly, the thickness of the first lens element 710 on the optical axis is CT1, the thickness of the second lens element 720 on the optical axis is CT2, and they satisfy the relation: CT2/CT1=0.79.

In the seventh embodiment of the present optical imaging lens assembly, the radius of curvature of the object-side surface 711 of the first lens element 710 is R1, the radius of curvature of the image-side surface 712 of the first lens element 710 is R2, and they satisfy the relation: R1/R2=0.05.

In the seventh embodiment of the present optical imaging lens assembly, the focal length of the optical imaging lens assembly is f, the focal length of the first lens element 710 is f1, and they satisfy the relation: f1/f=0.84.

In the seventh embodiment of the present optical imaging lens assembly, the focal length of the optical imaging lens assembly is f, the focal length of the second lens element 720 is f2, and they satisfy the relation: f/f2=−0.21.

In the seventh embodiment of the present optical imaging lens assembly, a light ray having an incident angle of 36 degrees relative to the optical axis and passing through a center of the aperture stop 700 intersects to form a point on an image-side surface 732 of the lens element 730 closest to the side of image, the perpendicular distance from the point to the optical axis is Yc1, half of the diagonal length of the effective pixel area of the electronic sensor is ImgH, and they satisfy the relation: Yc1/ImgH=0.67.

In the seventh embodiment of the present optical imaging lens assembly, a light ray having an incident angle of 37 degrees relative to the optical axis and passing through a center of the aperture stop 700 intersects to form a point on an image-side surface 732 of the lens element 730 closest to the side of image, the perpendicular distance from the point to the optical axis is Yc2, half of the diagonal length of the effective pixel area of the electronic sensor is ImgH, and they satisfy the relation: Yc2/ImgH=0.70.

In the seventh embodiment of the present optical imaging lens assembly, the distance on the optical axis between the aperture stop 700 and the electronic sensor is SL, the distance on the optical axis between the object-side surface 711 of the first lens element 710 and the electronic sensor is TTL, and they satisfy the relation: SL/TTL=0.96.

In the seventh embodiment of the present optical imaging lens assembly, the distance on the optical axis between the object-side surface 711 of the first lens element 710 and the electronic sensor is TTL, half of the diagonal length of the effective pixel area of the electronic sensor is ImgH, and they satisfy the relation: TTL/ImgH=1.60.

The detailed optical data of the seventh embodiment is shown in FIG. 20 (TABLE 13), and the aspheric surface data is shown in FIG. 21 (TABLE 14), wherein the units of the radius of curvature, the thickness and the focal length are expressed in mm, and HFOV is half of the maximal field of view.

It is to be noted that TABLES 1-14 (illustrated in FIGS. 8-21 respectively) show different data of the different embodiments, however, the data of the different embodiments are obtained from experiments. Therefore, any optical imaging lens assembly of the same structure is considered to be within the scope of the present invention even if it uses different data. The embodiments depicted above and the appended drawings are exemplary and are not intended to limit the scope of the present invention. TABLE 15 (illustrated in FIG. 22) shows the data of the respective embodiments resulting from the equations.

What is claimed is:

1. An optical imaging lens assembly comprising, in order from an object side to an image side:

a first lens element with positive refractive power having a convex object-side surface;

a second lens element with negative refractive power having a concave object-side surface; and a third lens element with negative refractive power having a concave image-side surface, at least one of the object-side and image-side surfaces thereof being aspheric; wherein the optical imaging lens assembly further comprises an aperture stop disposed between the first lens element and the second lens element and an electronic sensor for the image formation of an object; and wherein a focal length of the optical imaging lens assembly is f, a focal length of the second lens element is f2, a thickness of the first lens element on an optical axis is CT1, a thickness of the second lens element on the optical axis is CT2, a distance on the optical axis between the aperture stop and the electronic sensor is SL, a distance on the optical axis between the object-side surface of the first lens element and the electronic sensor is TTL, and they satisfy the relations: −0.22<f/f2<0.0, 0.30<CT2/CT1<0.95, 0.65<SL/TTL<0.90.

2. The optical imaging lens assembly according to claim 1, wherein a light ray having an incident angle of 37 degrees relative to the optical axis and passing through a center of the aperture stop intersects to form a point on an image-side surface of the lens element closest to the side of image, a perpendicular distance from the point to the optical axis is Yc2, half of the diagonal length of the effective pixel area of the electronic sensor is ImgH, and they satisfy the relation: 0.55<Yc2/ImgH<0.95.

3. The optical imaging lens assembly according to claim 1, wherein the image-side surface of the third lens element is provided with at least one inflection point.

4. The optical imaging lens assembly according to claim 3, wherein the second lens element has a convex image-side surface, and wherein the third lens element is made of plastic material and the object-side and image-side surfaces thereof are aspheric.

5. The optical imaging lens assembly according to claim 3, wherein the focal length of the optical imaging lens assembly is f, the focal length of the second lens element is f2, and they satisfy the relation: −0.12<f/f2<0.0.

6. The optical imaging lens assembly according to claim 3, wherein a light ray having an incident angle of 36 degrees relative to the optical axis and passing through a center of the aperture stop intersects to form a point on an image-side surface of the lens element closest to the side of image, a perpendicular distance from the point to the optical axis is Yc1, half of a diagonal length of an effective pixel area of the electronic sensor is ImgH, and they satisfy the relation: 0.45<Yc1/ImgH<0.95.

7. The optical imaging lens assembly according to claim 4, wherein the focal length of the optical imaging lens assembly is f, a focal length of the first lens element is f1, and they satisfy the relation: 0.65<f1/f<1.30.

8. The optical imaging lens assembly according to claim 4, wherein the thickness of the first lens element on the optical axis is CT1, the thickness of the second lens element on the optical axis is CT2, and they satisfy the relation: 0.50<CT2/CT1<0.87.

9. The optical imaging lens assembly according to claim 4, wherein the distance on the optical axis between the object-side surface of the first lens element and the electronic sensor is TTL, half of the diagonal length of the effective pixel area of the electronic sensor is ImgH, and they satisfy the relation: TTL/ImgH<1.95.

10. The optical imaging lens assembly according to claim 7, wherein the focal length of the optical imaging lens assembly is f, the focal length of the first lens element is f1, and they satisfy the relation: 0.72<f1/f<1.10.

11. The optical imaging lens assembly according to claim 7, wherein an Abbe number of the first lens element is V1, an Abbe number of the second lens element is V2, and they satisfy the relation: 28.5<V1−V2<42.0.

12. The optical imaging lens assembly according to claim 7, wherein the first lens element has a convex image-side surface.

13. An optical imaging lens assembly comprising, in order from an object side to an image side:
a first lens element with positive refractive power having a convex object-side surface;
a second lens element with negative refractive power having a concave object-side surface and a convex image-side surface; and
a third lens element having a concave image-side surface on which at least one inflection point is formed, the object-side and image-side surfaces thereof being aspheric; wherein the optical imaging lens assembly further comprises an aperture stop disposed between an object and the second lens element and an electronic sensor for the image formation of the object; and wherein a focal length of the optical imaging lens assembly is f, a focal length of the first lens element is f1, a radius of curvature of the object-side surface of the first lens element is R1, a radius of curvature of an image-side surface of the first lens element is R2, a light ray having an incident angle of 36 degrees relative to the optical axis and passing through a center of the aperture stop intersects to form a point on an image-side surface of the lens element closest to the side of image, a perpendicular distance from the point to the optical axis is Yc1, half of a diagonal length of an effective pixel area of the electronic sensor is ImgH, and they satisfy the relations: 0.65<f1/f<1.30, −1.00<R1/R2<0.65, 0.45<Yc1/ImgH<0.95.

14. The optical imaging lens assembly according to claim 13, wherein a light ray having an incident angle of 37 degrees relative to the optical axis and passing through a center of the aperture stop intersects to form a point on an image-side surface of the lens element closest to the side of image, a perpendicular distance from the point to the optical axis is Yc2, half of the diagonal length of the effective pixel area of the electronic sensor is ImgH, and they satisfy the relation: 0.55<Yc2/ImgH<0.95.

15. The optical imaging lens assembly according to claim 13, wherein the focal length of the optical imaging lens assembly is f, a focal length of the second lens element is f2, and they satisfy the relation: −0.22<f/f2<0.0.

16. The optical imaging lens assembly according to claim 13, wherein the distance on the optical axis between the object-side surface of the first lens element and the electronic sensor is TTL, half of the diagonal length of the effective pixel area of the electronic sensor is ImgH, and they satisfy the relation: TTL/ImgH<1.95.

17. The optical imaging lens assembly according to claim 13, wherein a distance on the optical axis between the aperture stop and the electronic sensor is SL, a distance on the optical axis between the object-side surface of the first lens element and the electronic sensor is TTL, and they satisfy the relation: 0.60<SL/TTL<1.10.

18. The optical imaging lens assembly according to claim 17, wherein the focal length of the optical imaging lens assembly is f, the focal length of the first lens element is f1, and they satisfy the relation: 0.72<f1/f<1.10.

19. The optical imaging lens assembly according to claim 17, wherein an Abbe number of the first lens element is V1, an Abbe number of the second lens element is V2, and they satisfy the relation: 28.5<V1−V2<42.0.

20. The optical imaging lens assembly according to claim 19, wherein a thickness of the first lens element on the optical axis is CT1, a thickness of the second lens element on the optical axis is CT2, and they satisfy the relation: 0.50<CT2/CT1<0.87.

* * * * *